US012250047B2

(12) United States Patent
Yuk et al.

(10) Patent No.: US 12,250,047 B2
(45) Date of Patent: Mar. 11, 2025

(54) GROUP-BASED BEAM REPORTING FOR MULTI-TRP OPERATION

(71) Applicant: Nokia Technologies Oy, Espoo (FI)

(72) Inventors: Youngsoo Yuk, Seoul (KR); Nitin Mangalvedhe, Hoffman Estates, IL (US); Keeth Saliya Jayasinghe Laddu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 40 days.

(21) Appl. No.: 18/002,781

(22) PCT Filed: Jul. 6, 2021

(86) PCT No.: PCT/FI2021/050528
§ 371 (c)(1),
(2) Date: Dec. 21, 2022

(87) PCT Pub. No.: WO2022/008801
PCT Pub. Date: Jan. 13, 2022

(65) Prior Publication Data
US 2023/0246697 A1 Aug. 3, 2023

Related U.S. Application Data
(60) Provisional application No. 63/049,677, filed on Jul. 9, 2020.

(51) Int. Cl.
*H04B 7/02* (2018.01)
*H04B 7/06* (2006.01)
*H04L 1/02* (2006.01)

(52) U.S. Cl.
CPC ......... *H04B 7/0691* (2013.01); *H04B 7/0626* (2013.01); *H04B 7/0695* (2013.01)

(58) Field of Classification Search
CPC .. H04B 7/0691; H04B 7/0626; H04B 7/0695; H04B 7/088; H04B 7/024
(Continued)

(56) References Cited

U.S. PATENT DOCUMENTS

2013/0286960 A1* 10/2013 Li .................. H04B 7/0684
370/329
2018/0048375 A1* 2/2018 Guo ................ H04B 7/024
(Continued)

FOREIGN PATENT DOCUMENTS

WO 2020/122687 A1 6/2020

OTHER PUBLICATIONS

"3rd Generation Partnership Project; Technical Specification Group Radio Access Network; NR; Physical layer procedures for data (Release 16)", 3GPP TS 38.214, V16.1.0, Mar. 2020, pp. 1-151.
(Continued)

*Primary Examiner* — Phuong Phu
(74) *Attorney, Agent, or Firm* — McCarter & English LLC

(57) ABSTRACT

The example embodiments of the invention provide at least a method and apparatus to receive, by a user equipment of a communication network, from a network node information for measurement reporting by the user equipment for beam management in the communication network, and based on the at least one beam reporting configuration, determine beam reporting at least one pair of beams of the more than one beam of the at least one transmission reception point capable for simultaneous reception by the user equipment. Further to determine, by a network node of a communication network, information for measurement reporting by user equipment for beam management in the communication network, and based on the determining, send the information towards the user equipment for use in determining beam
(Continued)

reporting of a pair of beams of the more than one beam of the at least one transmission reception point capable for the simultaneous reception by the user equipment, wherein the information comprises an indication of at least one beam reporting configuration for more than one beam of at least one transmission reception point capable for simultaneous reception by the user equipment to be measured by the user equipment.

14 Claims, 21 Drawing Sheets

(58) Field of Classification Search
USPC .................................. 375/260, 267, 299, 347
See application file for complete search history.

(56) References Cited

U.S. PATENT DOCUMENTS

| | | |
|---|---|---|
| 2020/0059290 A1 | 2/2020 | Pan et al. |
| 2020/0107327 A1 | 4/2020 | Wang et al. |
| 2020/0195332 A1* | 6/2020 | Kakishima ............. H04B 7/088 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.
"Revised WID: Enhancements on MIMO for NR", 3GPP TSG RAN Meeting #81, RP-182067, Agenda: 9.4.1, Samsung, Sep. 10-13, 2018, 5 pages.
"New WID: Further enhancements on MIMO for NR", 3GPP TSG RAN Meeting #86, RP-193133, Agenda: 9.1.1, Samsung, Dec. 9-12, 2019, 5 pages.
"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.
International Search Report and Written Opinion received for corresponding Patent Cooperation Treaty Application No. PCT/FI2021/050528, dated Nov. 12, 2021, 15 pages.
"Preliminary views on further enhancement for NR MIMO", 3GPP TSG RAN WG1 Meeting #101-e, R1-2003483, Agenda: 7.2.6.6, ZTE, May 25-Jun. 5, 2020, 18 pages.
"Feature Summary of Enhancements on Multi-TRP/Panel Transmission", 3GPP TSG RAN WG1 Meeting #99, R1-1913299, Agenda: 7.2.8.2, Huawei, Nov. 18-22, 2019, 88 pages.

* cited by examiner

```
-- ASN1START
-- TAG-TCI-STATE-START

TCI-State ::=          SEQUENCE {
    tci-StateId            TCI-StateId,
    qcl-Type1              QCL-Info,
    qcl-Type2              QCL-Info                           OPTIONAL, -- Need R
    ...
}

QCL-Info ::=           SEQUENCE {
    cell                   ServCellIndex
    bwp-Id                 BWP-Id                             OPTIONAL, -- Need R
    Indicated
    referenceSignal        CHOICE {
        csi-rs                 NZP-CSI-RS-ResourceId,
        ssb                    SSB-Index
    },
    qcl-Type               ENUMERATED {typeA, typeB, typeC, typeD},
    ...
}

-- TAG-TCI-STATE-STOP
-- ASN1STOP
```

| Oct 1 | BWP ID | SERVING Cell ID | CORE SET PooL ID |
|---|---|---|---|
| Oct 2 | $T_0$ | $T_1$ | $T_2$ | $T_3$ | $T_4$ | $T_5$ | $T_6$ | $T_7$ |
| Oct 3 | $T_8$ | $T_9$ | $T_{10}$ | $T_{11}$ | $T_{12}$ | $T_{13}$ | $T_{14}$ | $T_{15}$ |
| ⋮ |
| Oct N | $T_{(N-2)\times 8}$ | $T_{(N-2)\times 8+1}$ | $T_{(N-2)\times 8+2}$ | $T_{(N-2)\times 8+3}$ | $T_{(N-2)\times 8+4}$ | $T_{(N-2)\times 8+5}$ | $T_{(N-2)\times 8+6}$ | $T_{(N-2)\times 8+7}$ |

FIG.4

| Oct 1 | CORESET ID | SERVING Cell ID |
|---|---|---|
| Oct 2 | TCI STATE ID | CORE SET ID |

```
-- ASN1START groupBasedBeamReporting      CHOICE {
    enabled
        SSBGroup              SEQUENCE {
            CHOICE {
                shortBitmap       BIT STRING (SIZE (4)),
                mediumBitmap      BIT STRING (SIZE (8)),
                longBitmap        BIT STRING (SIZE (64))
            }                                              OPTIONAL
        },
    disabled                  SEQUENCE {
        nrofReportedRS        ENUMERATED {n1, n2, n3, n4}  OPTIONAL  --
Need S
    }
}

-- ASN1STOP
```

FIG.6

```
-- ASN1START
-- TAG-TCI-STATE-START

TCI-State ::=            SEQUENCE {
    tci-StateId              TCI-StateId,
    qcl-Type1                QCL-Info,
    qcl-Type2                QCL-Info                                          OPTIONAL,    -- Need R
    ...
}

QCL-Info ::=             SEQUENCE {
    cell                     ServCellIndex                                     OPTIONAL,    -- Need R
    bwp-Id                   BWP-Id                                            OPTIONAL,    -- Cond CSI-RS-
Indicated
    referenceSignal          CHOICE {
        csi-rs                   NZP-CSI-RS-ResourceId,
        ssb                      SSB-Index
    },
    qcl-Type                 ENUMERATED {typeA, typeB, typeC, typeD},
    tciGroupId               ENUMERATED {g1, g2}                               OPTIONAL,    -- Need R    -- Cond qcl-TypeD
    ...
}

-- TAG-TCI-STATE-STOP
-- ASN1STOP
```

FIG.7

```
-- ASN1START
-- TAG-TCI-STATE-START

TCI-State ::=        SEQUENCE {
    tci-StateId          TCI-StateId,
    qcl-Type1            QCL-Info,
    qcl-Type2            QCL-Info                                OPTIONAL, -- Need R
    ...,
    tciGroupId           ENUMERATED {g1, g2}                     OPTIONAL, -- Need R -- Cond qcl-TypeD
}

QCL-Info ::=         SEQUENCE {
    cell                 ServCellIndex                           OPTIONAL, -- Need R
    bwp-Id               BWP-Id                                  OPTIONAL, -- Cond CSI-RS--
Indicated
    referenceSignal      CHOICE {
        csi-rs               NZP-CSI-RS-ResourceId,
        ssb                  SSB-Index
    },
    qcl-Type             ENUMERATED {typeA, typeB, typeC, typeD},
    ...
}

-- TAG-TCI-STATE-STOP
-- ASN1STOP
```

FIG.8

```
-- ASN1START
-- TAG-TCI-STATE-START

TCI-State ::=          SEQUENCE {
    tci-StateId            TCI-StateId,
    qcl-Type1              QCL-Info,
    qcl-Type2              QCL-Info         OPTIONAL,   -- Need R
    ...
}

QCL-Info ::=           SEQUENCE {
    cell                   ServCellIndex    OPTIONAL,   -- Need R
    bwp-Id                 BWP-Id           OPTIONAL,   -- Cond CSI-RS-
Indicated
    referenceSignal        CHOICE {
        csi-rs                 NZP-CSI-RS-ResourceId,
        ssb                    SSB-Index
    },
    qcl-Type               ENUMERATED {typeA, typeB, typeC, typeD},
    coresetpoolIndex       CORESETPoolIndex OPTIONAL,   -- Need R  -- Cond qcl-TypeD
    ...
}

-- TAG-TCI-STATE-STOP
-- ASN1STOP
```

FIG.9

```
-- ASN1START
groupBasedBeamReporting      CHOICE {
    enabled                          SEQUENCE}
        tciGroup-specific         ENUMERATED {sameGroup, diffGroup}    OPTIONAL    --
Need R
    }disabled                        SEQUENCE {
Need S   nrofReportedRS          ENUMERATED {n1, n2, n3, n4}           OPTIONAL    --
    ~
}
-- ASN1STOP OPTION 3)
-- ASN1START
groupBasedBeamReporting      CHOICE {
    enabled                          SEQUENCE}
        CORESETPool-specific      ENUMERATED {enabled}                 OPTIONAL    --
Need R
    }disabled                        SEQUENCE {
Need S   nrofReportedRS          ENUMERATED {n1, n2, n3, n4}           OPTIONAL    --
    ~
}
-- ASN1STOP
```

FIG.10

```
CSI-ReportConfig ::=            SEQUENCE {
    reportConfigId                  CSI-ReportConfigId,
    carrier                         ServCellIndex                       OPTIONAL,   -- Need S
    resourcesForChannelMeasurement  CSI-ResourceConfigId,
    associatedReport                CSI-ReportConfigId                  OPTIONAL
    reportQuantity                  CHOICE {
        none                            NULL,
        cri-RI-PMI-CQI                  NULL,
        cri-RI-i1                       NULL,
        cri-RI-i1-CQI                   SEQUENCE {
            pdsch-BundleSizeForCSI          ENUMERATED {n2, n4}         OPTIONAL    --
Need S
        };
        cri-RI-CQI                      NULL,
        cri-RSRP                        NULL,
        ssb-Index-RSRP                  NULL,
        cri-RI-LI-PMI-CQI               NULL
    },
    ...;
    groupBasedBeamReporting         CHOICE {
        enabled                         NULL,
        disabled                        SEQUENCE {
            nrofReportedRS                  ENUMERATED {n1, n2, n3, n4} OPTIONAL    --
Need S
        }
    },
    ...
}
-- TAG-CSI-REPORTCONFIG-STOP
-- ASN1STOP
```

FIG.12

```
┌─────────────────────────────────────────────────┐
│   DETERMINING, BY A NETWORK NODE OF A COMMUNICATION │
│ NETWORK, INFORMATION FOR MEASUREMENT REPORTING BY USER │
│  EQUIPMENT FOR BEAM MANAGEMENT IN THE COMMUNICATION │
│      NETWORK, WHEREIN THE INFORMATION COMPRISES AN      │──2210
│ INDICATION OF AT LEAST ONE BEAM REPORTING CONFIGURATION │
│  FOR MORE THAN ONE BEAM OF AT LEAST ONE TRANSMISSION    │
│  RECEPTION POINT CAPABLE FOR SIMULTANEOUS RECEPTION BY  │
│      THE USER EQUIPMENT TO BE MEASURED BY THE USER      │
│                        EQUIPMENT                        │
└─────────────────────────────────────────────────┘
                            │
                            ▼
┌─────────────────────────────────────────────────┐
│      BASED ON THE DETERMINING, SEND THE INFORMATION     │
│       TOWARDS THE USER EQUIPMENT FOR USE IN DETERMINING │
│ BEAM REPORTING OF A PAIR OF BEAMS OF THE MORE THAN ONE  │──2220
│  BEAM OF THE AT LEAST ONE TRANSMISSION RECEPTION POINT  │
│   CAPABLE FOR THE SIMULTANEOUS RECEPTION BY THE USER    │
│                        EQUIPMENT                        │
└─────────────────────────────────────────────────┘
```

FIG.22

GROUP-BASED BEAM REPORTING FOR MULTI-TRP OPERATION

RELATED APPLICATION

This application was originally filed as PCT Application No. PCT/FI2021/050528, filed on Jul. 6, 2021, which claims priority from U.S. Provisional Application No. 63/049,677, filed on Jul. 9, 2020, each of which is incorporated herein by reference in its entirety.

TECHNICAL FIELD

The teachings in accordance with the exemplary embodiments of this invention relate generally to an enhancement of group-based beam reporting to support multi-TRP transmission and, more specifically, relate to enhancement of group-based beam reporting to support multi-TRP transmission for simultaneous communication over two or more beams.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
CE Control Element
CRI CSI-RS Resource Indicator
CSI channel state information
CSI-RS Channel State Information Reference Signal
DCI Downlink Control Information
eMBB enhanced Mobile Broadband
FR frequency range
MAC Medium Access Control
PDCCH Physical Downlink Control Channel
PDSCH Physical Downlink Shared Channel
QCL Quasi-colocation
RRC Radio Resource Control
RS Reference Signal
RSRP Reference Signal Received Power
SSB Synchronization Signal Block
SSBRI SSB Resource Indicator
TRP Transmission Reception Point
TCI Transmission Configuration Indication Wireless communications systems are widely deployed to provide various types of communication capabilities for devices including user equipment and other network devices using multiple-access systems of a network to communicate with one another. Examples of such multiple-access systems include 4G systems such as Long Term Evolution (LTE) type systems, and 5G systems which may be referred to as New Radio (NR) systems. A wireless multiple-access communications system may include a number of base stations or network access nodes to support these communication devices and systems.

In certain cases, a UE may communicate with two or more base stations such as by using two or more transmission reception points (TRPs)) over time and frequency resources dedicated for communications between the TRPs and the UE. The TRPs may coordinate (e.g., dynamically or semi-statically) communications to the UE over backhaul links, which may be subject to changing channel conditions and/or backhaul throughput limitations.

Example embodiments of the invention work to improve operations such as group-based beam reporting for at least these types of communication operations.

SUMMARY

In an example aspect of the invention, there is an apparatus, such as a user equipment side apparatus comprising at least one processor; and at least one non-transitory memory including computer program code, where the at least one non-transitory memory and the computer program code are configured, with the at least one processor, to cause the apparatus to at least: receive, by a user equipment of a communication network, from a network node information for measurement reporting by the user equipment for beam management in the communication network, wherein the information comprises an indication of at least one beam reporting configuration for more than one beam of at least one transmission reception point capable for simultaneous reception by the user equipment to be measured by the user equipment; and based on the at least one beam reporting configuration, determine beam reporting at least one pair of beams of the more than one beam of the at least one transmission reception point capable for simultaneous reception by the user equipment.

In another example aspect of the invention, there is a method comprising: receiving, by a user equipment of a communication network, from a network node information for measurement reporting by the user equipment for beam management in the communication network, wherein the information comprises an indication of at least one beam reporting configuration for more than one beam of at least one transmission reception point capable for simultaneous reception by the user equipment to be measured by the user equipment; and based on the at least one beam reporting configuration, determining beam reporting at least one pair of beams of the more than one beam of the at least one transmission reception point capable for simultaneous reception by the user equipment.

A further example embodiment is an apparatus and a method comprising the apparatus and the method of the previous paragraphs, wherein the at least one beam reporting configuration comprises an indication of association of more than one beam with at least one of two or more transmission reception points or association of more than one beam with a same transmission reception point of the at least one transmission reception point, wherein the information comprises each beam of the more than one beam is identified by a reference signal associated with one of a channel state information reference signal or a Synchronization Signal Block, wherein based on the reference signal the user equipment is selecting a best two beams of the more than one beam from different groups of at least one of a synchronization signal block group or a transmission configuration indication group or from two or more transmission reception points, wherein an indication of the at least one of a synchronization signal block group or a transmission configuration indication group is received by the user equipment via a radio resource control configuration associated with the information, wherein the at least one of a synchronization signal block group or a transmission configuration indication group identify which synchronization signal block group or transmission configuration indication group or which at least one transmission reception point the reference signal is associated with, wherein the at least one transmission configuration indicator is identifying quasi co-location information, wherein the quasi co-location information is configured with an indicator identifying at least one transmission configuration indicator group associated with the at least one transmission reception point for use by the user equipment to determine beams for the beam reporting, wherein the at least one transmission configuration indicator is associated with a control resource pool index, wherein the control resource pool index uses a bit value to identifying beams of a transmission configuration indicator group associated with the at least one transmission reception point for use by the user equipment to determine beams for the beam reporting, wherein the at least one beam reporting configuration comprises two or more beam reporting configurations, where the two or more beam reporting comprises individual configurations for each one or more transmission reception point of the at least one transmission reception point, wherein the two or more beam reporting configurations are at least one of mutually associated or associated with another beam reporting configuration of the two or more beam reporting configurations, wherein two channel state indication report configurations of the one or more channel state indication report configuration are associated with a radio resource control parameter of an associated report, and/or wherein any beam of the two or more associated beam reporting configurations is received by the user equipment simultaneously with any other beam of the two or more associated reporting configurations for an associated beam reporting.

A non-transitory computer-readable medium storing program code, the program code executed by at least one processor to perform at least the method as described in the paragraphs above.

In another example aspect of the invention, there is an apparatus comprising: means for receiving, by a user equipment of a communication network, from a network node information for measurement reporting by the user equipment for beam management in the communication network, wherein the information comprises an indication of at least one beam reporting configuration for more than one beam of at least one transmission reception point capable for simultaneous reception by the user equipment to be measured by the user equipment; and means, based on the at least one beam reporting configuration, for determining beam reporting at least one pair of beams of the more than one beam of the at least one transmission reception point capable for simultaneous reception by the user equipment.

In accordance with the example embodiments as described in the paragraph above, at least the means for receiving and means for determining comprises a network interface, and computer program code stored on a computer-readable medium and executed by at least one processor.

In another example aspect of the invention, there is an apparatus, such as a network side apparatus, comprising: at least one processor; and at least one memory including computer program code, where the at least one memory and the computer program code are configured, with the at least one processor, to cause the apparatus to at least: determine, by a network node of a communication network, information for measurement reporting by user equipment for beam management in the communication network, wherein the information comprises an indication of at least one beam reporting configuration for more than one beam of at least one transmission reception point capable for simultaneous reception by the user equipment to be measured by the user equipment; and based on the determining, send the information towards the user equipment for use in determining beam reporting of a pair of beams of the more than one beam of the at least one transmission reception point capable for the simultaneous reception by the user equipment.

In another example aspect of the invention, there is a method comprising: determining, by a network node of a communication network, information for measurement reporting by user equipment for beam management in the communication network, wherein the information comprises an indication of at least one beam reporting configuration for more than one beam of at least one transmission reception point capable for simultaneous reception by the user equipment to be measured by the user equipment; and based on the determining, sending the information towards the user equipment for use in determining beam reporting of a pair of beams of the more than one beam of the at least one transmission reception point capable for the simultaneous reception by the user equipment.

A non-transitory computer-readable medium storing program code, the program code executed by at least one processor to perform at least the method as described in the paragraphs above.

A further example embodiment is an apparatus and a method comprising the apparatus and the method of the previous paragraphs, wherein the at least one beam reporting configuration comprises an indication of association of more than one beam with at least one of two or more transmission reception points or association of more than one beam with a same transmission reception point of the at least one transmission reception point, wherein the information comprises each beam of the more than one beam is identified by a reference signal associated with one of a channel state information reference signal or a Synchronization Signal Block, wherein based on the reference signal the user equipment is caused to select a best two beams of the more than one beam from different groups of at least one of a synchronization signal block group or a transmission configuration indication group or from two or more transmission reception points, wherein an indication of the at least one of a synchronization signal block group or a transmission configuration indication group is sent to the user equipment via a radio resource control configuration associated with the information for measurement reporting, wherein the at least one of a synchronization signal block group or a transmission configuration indication group identify which synchronization signal block group or transmission configuration indication group or which at least one transmission reception point the reference signal is associated with, wherein the at least one transmission configuration indicator is identifying quasi co-location information, wherein the quasi co-location information is configured with an indicator identifying at least one transmission configuration indicator group associated with the at least one transmission reception point for use by the user equipment to determine beams for the beam reporting, wherein the at least one transmission configuration indicator is associated with a control resource pool index, wherein the control resource pool index uses a bit value to identifying beams of a transmission configuration indicator group associated with the at least one transmission reception point for use by the user equipment to determine beams for the beam reporting, wherein the at least one beam reporting configuration comprises two or more beam reporting configurations, where the two or more beam reporting comprises individual configurations for each one or more transmission reception point of the at least one transmission reception point, wherein the two or more beam reporting configurations are at least one of mutually associated or associated with another beam reporting configuration of the two or more beam reporting configurations, wherein two channel state indication report configurations of the one or more channel state indication report configuration are associated with a radio resource control parameter of an associated report, and/or wherein any beam of the two or more associated beam reporting configurations is communicated to the user equipment simultaneously with any other beam for an associated beam reporting for an associated beam reporting.

In another example aspect of the invention, there is an apparatus comprising: means for determining, by a network node of a communication network, information for measurement reporting by user equipment for beam management in the communication network, wherein the information comprises an indication of at least one beam reporting configuration for more than one beam of at least one transmission reception point capable for simultaneous reception by the user equipment to be measured by the user equipment; and based on the determining, means for sending the information towards the user equipment for use in determining beam reporting of a pair of beams of the more than one beam of the at least one transmission reception point capable for the simultaneous reception by the user equipment.

In accordance with the example embodiments as described in the paragraph above, at least the means for determining and means for sending comprises a network interface, and computer program code stored on a computer-readable medium and executed by at least one processor.

A communication system comprising the user equipment side apparatus and/or the network side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 1 shows TCI state specification operations;

FIG. 3 shows TCI States Activation/Deactivation for UE-specific PDSCH MAC CE;

FIG. 4 shows TCI State Indication for UE-specific PDCCH MAC CE;

FIG. 6 shows specification information related to a bitmap of an SSBGroup;

FIG. 7 shows an example of specification information for QCL-type D association;

FIG. 8 shows another example of specification information for QCL-type D association;

FIG. 9 shows a further example of specification information for QCL-type D association;

FIG. 10 shows an example of specification information options for group based beam reporting in accordance with example embodiments of the invention;

FIG. 12 shows a CSI Report Configuration in accordance with an example embodiment of the invention;

FIG. 17, FIG. 18, FIG. 19, FIG. 20, FIG. 21 and FIG. 22 each show a method in accordance with example embodiments of the invention which may be performed by an apparatus.

DETAILED DESCRIPTION

Figure 2:
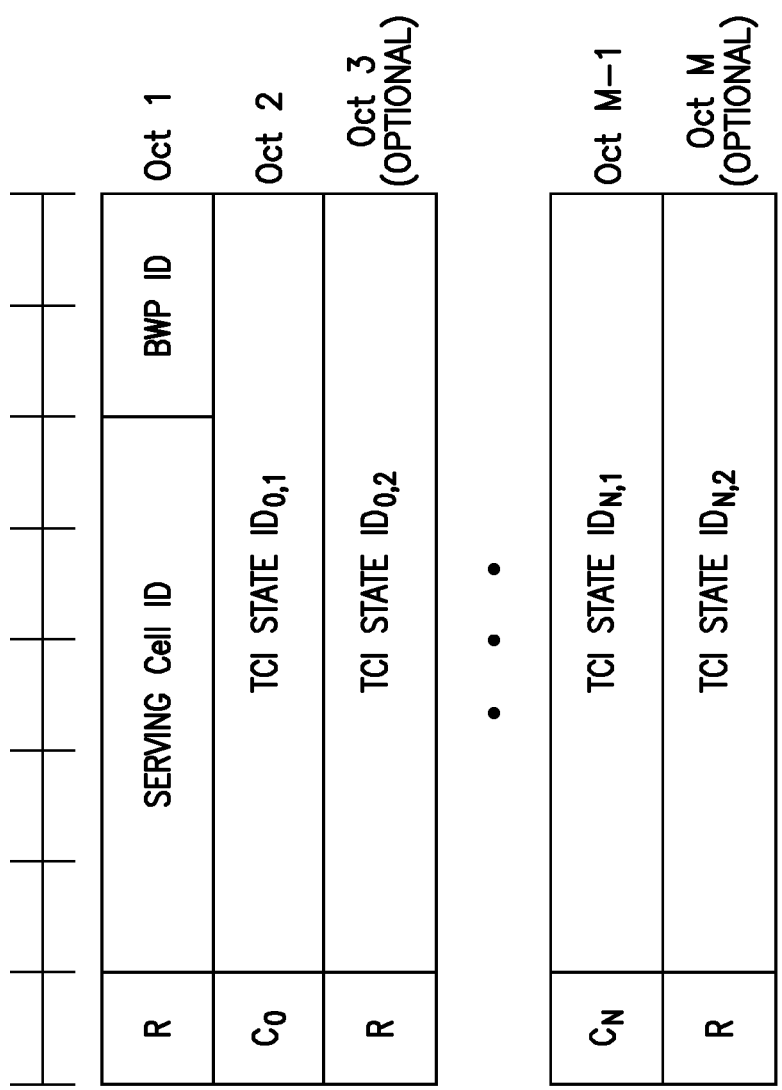
FIG. 2 shows Enhanced TCI States Activation/Deactivation for UE-specific PDSCH MAC CE.

In example embodiments of the invention there is at least a method and apparatus to perform group-based beam reporting to support multi-TRP transmission for simultaneous communication over two or more beams.

Certain example embodiments of the invention related to the Multi-TRP/Panel transmissions, which is a part of the ongoing 3GPP work items at the time of this application for (further) enhancements on MIMO. Multi-TRP/Panel transmission considers as an essential component in NR deployments not only due to the benefits of eMBB operations but also due to the capability of improving reliability for the URLLC services. The work item description of MIMO enhancements indicates the following:

Enhancements on multi-TRP/panel transmission including improved reliability and robustness with both ideal and non-ideal backhaul:

Specify downlink control signalling enhancement(s) for efficient support of non-coherent joint transmission Perform study and, if needed, specify enhancements on uplink control signalling and/or reference signal(s) for non-coherent joint transmission Multi-TRP techniques for URLLC requirements are included in this WI It is noted that one 3GPP release only managed to discuss and finalize URLLC schemes for PDSCH and the basic framework of non-coherent joint transmission schemes based on single and multiple PDCCH design. As time was limited to discuss all the details, some work has been carried over to a further release.

In this further release the objectives are stated as below:

2. Enhancement on the support for multi-TRP deployment, targeting both FR1 and FR2:

a. Identify and specify features to improve reliability and robustness for channels other than PDSCH (that is, PDCCH, PUSCH, and PUCCH) using multi-TRP and/or multi-panel, with Rel.16 reliability features as the baseline;

b. Identify and specify QCL/TCI-related enhancements to enable inter-cell multi-TRP operations, assuming multi-DCI based multi-PDSCH reception;

c. Evaluate and, if needed, specify beam-management-related enhancements for simultaneous multi-TRP transmission with multi-panel reception;

d. Enhancement to support HST-SFN deployment scenario:

i. Identify and specify solution(s) on QCL assumption for DMRS, e.g. multiple QCL assumptions for the same DMRS port(s), targeting DL-only transmission;

ii. Evaluate and, if the benefit over Rel.16 HST enhancement baseline is demonstrated, specify QCL/QCL-like relation (including applicable type(s) and the associated requirement) between DL and UL signal by reusing the unified TCI framework;

4. Enhancement on CSI measurement and reporting:

a. Evaluate and, if needed, specify CSI reporting for DL multi-TRP and/or multi-panel transmission to enable more dynamic channel/interference hypotheses for NCJT, targeting both FR1 and FR2

It is noted that among sub-objectives of this further release scope, a beam management enhancement for simultaneous multi-TRP transmission.

In another 3GPP release, basic framework of the beam management can be as follows:

1) Procedure 1: Initial acquisition of the DL TX beam from SSBs:
   a. UE measures RSRP across the multiple SSBs in the beginning of every 5 ms;
   b. UE reports to gNB N SSB indices (having strongest RSRP measured) and the RSRP. (where N is the number of reported RS, configured in RRC);
   c. gNB use one of the reported beams for DL channel transmission (e.g. CSI-RS, PDCCH, PDSCH etc.);
2) Procedure 2: DL fine TX beam tracking based on CSI-RS for L1-RSRP:
   a. UE can be configured with a CSI-RS resource set configured with "repetition=OFF";
   b. The CSI-RS resource set is composed of multiple CSI-RS resources having different TCI states (different beams);
   c. The UE may report to gNB N strongest CSI-RS resource indices (CRIs) and their measured RSRP;
3) Procedure 3: DL RX beam refinement:
   a. UE can be configured with a CSI-RS resource set configured with "repetition=ON";
   b. The CSI-RS resource set is composed of multiple CSI-RS resources having same TCI states (same beam);
   c. The UE can adjust UE RX beam comparing the RX RSRP according to different RX beams.

For beam management, a UE can be configured to perform beam reporting by a CSI-Report configuration, (i.e. CSI-ReportConfig). CSI report configuration is composed of:

Report ID, report types, report quantity, measurement resources and other report parameters.

When the reporting is intended for beam management, "report quantity" is related to RSRP report. (SSB RSRP or CSI-RS RSRP). UE shall report the index of the measurement resources and their RSRPs.

TCI states are used for providing quasi co-location (QCL) relation between two reference signals (RS). For a reference signal, a TCI state can be configured. TCI state is composed of a reference RS and one or two QCL-types. Four QCL-types are defined in a 3GPP specification.

The quasi co-location types corresponding to each DL RS are given by the higher layer parameter qcl-Type in QCL-Info and may take one of the following values:

'QCL-TypeA': {Doppler shift, Doppler spread, average delay, delay spread};
'QCL-TypeB': {Doppler shift, Doppler spread}
'QCL-TypeC': {Doppler shift, average delay}
'QCL-TypeD': {Spatial Rx parameter}

For example, if two RSs are QCLed with Type-C, the two RSs have the same channel statistics with respect to Doppler shift and average delay.

FIG. 1 shows TCI state specification operations. As shown in FIG. 1, if a CSI-RS is configured with a TCI state composed of a reference RS (e.g. SSB1) and QCL-Type (e.g. QCL-TypeC and QCL-TypeD), then it means, the CSI-RS has the same channel statistics as the SSB1 with respect to "average delay, Doppler shift" and spatial RX parameter (RX beam direction, FR2 only).

So, in general, a TCI state can be considered as indication of a TX beam. In FR2, if two RSs are associated with a TCI state of QCL-Type A and QCL-TypeD, then the two reference signals are transmitted with the same transmit beam.

In a 3GPP Release 16 multi-TRP operation is specified for two types of schemes. One is the single-DCI based scheme, and the other is multi-DCI based scheme, as described below.

1) Single DCI based scheme: UE receives one PDCCH from a TRP and the PDCCH schedules PDSCH from one or two TRPs. PDSCH from a different TRP is differentiated by the TCI indication of the DCI in the PDCCH:
   UE receives a MAC-CE (FIG. 2) to activate up to 8 TCI states or pairs of TCI states. The MAC-CE includes mapping n (n<=8) TCI codepoints to one or two TCI states,
   The TCI field in DCI indicates one of the n TCI codepoints. If the TCI codepoint is associated with a single TCI state, PDSCH is scheduled from a single TRP, while if the TCI codepoint is associated with two TCI states, PDSCH is scheduled from two TRPs, each associated with one of two TCI states;
2) Multi-DCI based scheme: UE can receive PDCCH and PDSCH from two TRPs separately:
   A CORESET for PDCCH can have a CORESET-PoolIndex to indicate which TRP it is associated with, and the UE can know which TRP a PDCCH is transmitted from,
   The UE may be configured with separate beam management configurations corresponding to the two TRPs and each TRP may select its own TCI state (TX beam) for PDCCH or PDSCH,
   One MAC-CE (FIG. 3) is transmitted, and each DCI can indicate one of n (n<=8) TCI states in the MAC-CE.

In accordance with this specification gNB may update its TX beams or its candidate TX beams or beam pairs via MAC-CE.

Further, in other 3GPP releases three MAC-CEs are specified for PDCCH and PDSCH beam update.

FIG. 2 shows Enhanced TCI States Activation/Deactivation for UE-specific PDSCH MAC CE.

FIG. 3 shows TCI States Activation/Deactivation for UE-specific PDSCH MAC CE.

FIG. 4 shows TCI State Indication for UE-specific PDCCH MAC CE.

In these cases as shown in FIG. 2, FIG. 3, and FIG. 4 there can be:

Enhanced TCI States Activation/Deactivation for UE-specific PDSCH MAC CE
  TCI codepoint n (n=1, . . . 8)=(TCI state $ID_{n,1}$, TCI state $ID_{n,2}$ In multi-TRP operation in FR2, UE can be scheduled with multiple beams from different TRPs. Because UE RX beamforming is usually implemented with hybrid beamforming, UE only can direct RX beam in a single direction. However, if two transmission beams for the multi-TRP operation are associated with a UE RX panel, only one of two beams can be received by the panel. For example, in the FIG. 5 (right), beam pair {beam 1, beam 5} or {beam2, beam3} are associated with single panel, and they cannot be received simultaneously due to the limitation.

In single-DCI based multi-TRP scheme, if a pair of TCI states cannot be received by the UE at the same time, the PDSCH reception will fail.

In multi-DCI based multi-TRP scheme, if the two TCI states scheduled by the two TRPs cannot be received simultaneously, UE only receive only a PDSCH and other PDSCH reception will fail.

On other hand, a TRP transmitter also suffers a similar problem when determining transmission beams. One TRP panel can transmit a single beam at a time. For example, in FIG. 5, TRP1 is only capable of transmitting either beam 1 or beam 2, and UE cannot be scheduled with these two beams even though it can receive both beams at the same time as shown int the FIG. 5 (right).

Figure 5:
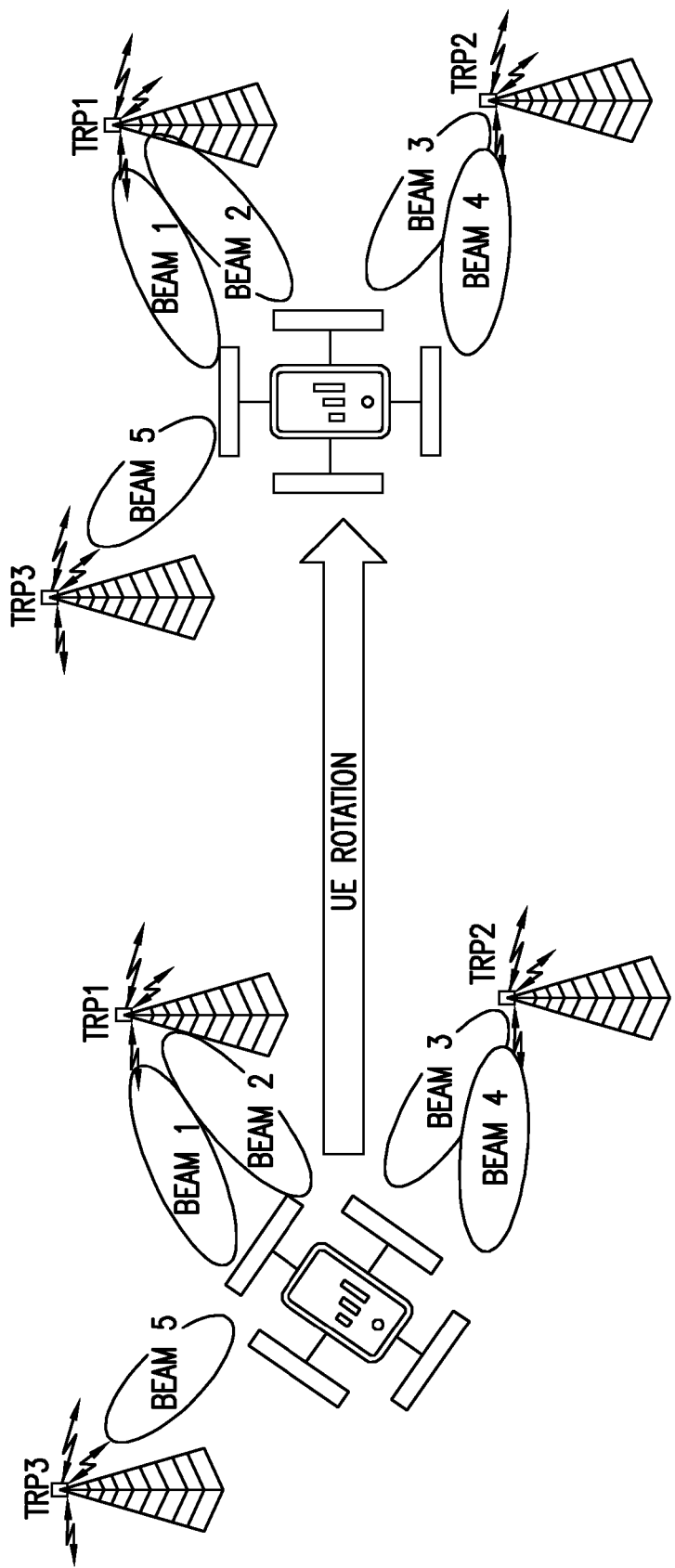
FIG. 5 shows Beam management for Multi-TRP and Multi-panel UE.

FIG. 5 shows Beam management for Multi-TRP and Multi-panel UE. As shown in FIG. 5, a UE can receive beam 2 and beam 3 by two panels, and TRP1 and TRP2 can transmit them. But, if the UE is rotated (right), then beam 2 and beam 3 cannot be simultaneously received. In this case, if the UE reports beam 1 and beam 2 as a preferred pair of two beams, another problem that occurs is that TRP1 cannot transmit beam 1 and beam 2 simultaneously.

Group beam reporting in 3GPP specifications at the time of this application can be considered as one aspect to solve the problem.

If groupBasedBeamReporting is enabled, the UE shall report a pair of RSs (SSB resource or CSI-RS resource) which can be received simultaneously. However, as shown below RRC ASN.1 code, if groupBasedBeamReporting is enabled, only one pair of RSs can be reported, and if the pair cannot be transmitted simultaneously, the gNB would suffer limitation for scheduling.

In accordance with specifications at the time of this application:
if the UE is configured with a CSI-ReportConfig with the higher layer parameter reportQuantity set to 'cri-RSRP' or 'ssb-Index-RSRP',
if the UE is configured with the higher layer parameter groupBasedBeamReporting set to 'disabled', the UE is not required to update measurements for more than 64 CSI-RS and/or SSB resources, and the UE shall report in a single report nrofReportedRS (higher layer configured) different CRI or SSBRI for each report setting,
if the UE is configured with the higher layer parameter groupBasedBeamReporting set to 'enabled', the UE is not required to update measurements for more than 64 CSI-RS and/or SSB resources, and the UE shall report in a single reporting instance two different CRI or SSBRI for each report setting, where CSI-RS and/or SSB resources can be received simultaneously by the UE either with a single spatial domain receive filter, or with multiple simultaneous spatial domain receive filters.

Thus, it can be seen that group-beam reporting can solve the problem only for the limited cases with very smart configuration from the gNB.

Further, due to limitation of the number of combinations, if the UE selects two TCIs from one TRP, there is no way to schedule two different beams from two TRPs. If UE reports two beams from the same TRP (e.g. beam 1 and beam 2 at the right of FIG. 5), gNB just schedules one of the two beams and the UE use single TRP operation only.

Due to ambiguity about the association of TRP and TCI states (TX beams) and the association of UE panels and RX beams, the gNB's scheduler cannot fully exploit the multi-TRP opportunity.

In addition, for multi-DCI based multi-TRP, group-based beam reporting is hardly used because each TRP may send its own beam management process. So, the solution should cover the non-group-based reporting case, too.

If groupBasedBeamReporting is disabled and the nrofReportedRS is n2, the report shall include feedback on the best two RSs as follows: $1^{st}$ SSB Index, RSRP of $1^{st}$ SSB, $2^{nd}$ SSB Index, delta RSRP of $2^{nd}$ SSB from RSRP of $1^{st}$ SSB. Delta RSRP is 4 bits 0000-1111.

Further, as a part of a 3GPP standard for Report Quantity Configurations, there can be the following text. If the UE is configured with a CSI-ReportConfig with the higher layer parameter reportQuantity set to 'cri-RSRP' or 'ssb-Index-RSRP':
if the UE is configured with the higher layer parameter groupBasedBeamReporting set to 'disabled', the UE is not required to update measurements for more than 64 CSI-RS and/or SSB resources, and the UE shall report in a single report nrofReportedRS (higher layer configured) different CRI or SSBRI for each report setting. And, if the UE is configured with an associated Report the UE shall report in a single report instance different CRI or SSBRI for each setting where CSI-RS and/or SSB resources can be received simultaneously with the reported CSI-RS and/or SSB resources in the associated Report by the UE; and
if the UE is configured with the higher layer parameter groupBasedBeamReporting set to 'enabled', the UE is not required to update measurements for more than 64 CSI-RS and/or SSB resources, and the UE shall report in a single reporting instance two different CRI or SSBRI for each report setting, where CSI-RS and/or SSB resources can be received simultaneously by the UE either with a single spatial domain receive filter, or with multiple simultaneous spatial domain receive filters. And, if the UE is configured with a SSBGroup or a tciGroup-specific, the UE shall report one CSI-RS and/or SSB resource per TCI group and they can be received simultaneously by the UE either with a single spatial domain receive filter, or with multiple simultaneous spatial domain receive filters.

Example embodiments of the invention at least provide an enhancement of group-based beam reporting to support multi-TRP transmission, especially for ideal/near-ideal backhaul between TRPs. (it can be used for non-ideal backhaul with a certain level of time delay in beam management).

In accordance with an example embodiment of the invention the UE can be configured with two CSI reports for beam management separately for two TRPs, and the UE may report the best beam(s) per TRP. In accordance with an embodiment of the invention, if two CSI-reports are associated, the UE shall select beams for each CSI-report that can be received simultaneously.

Figure 16:
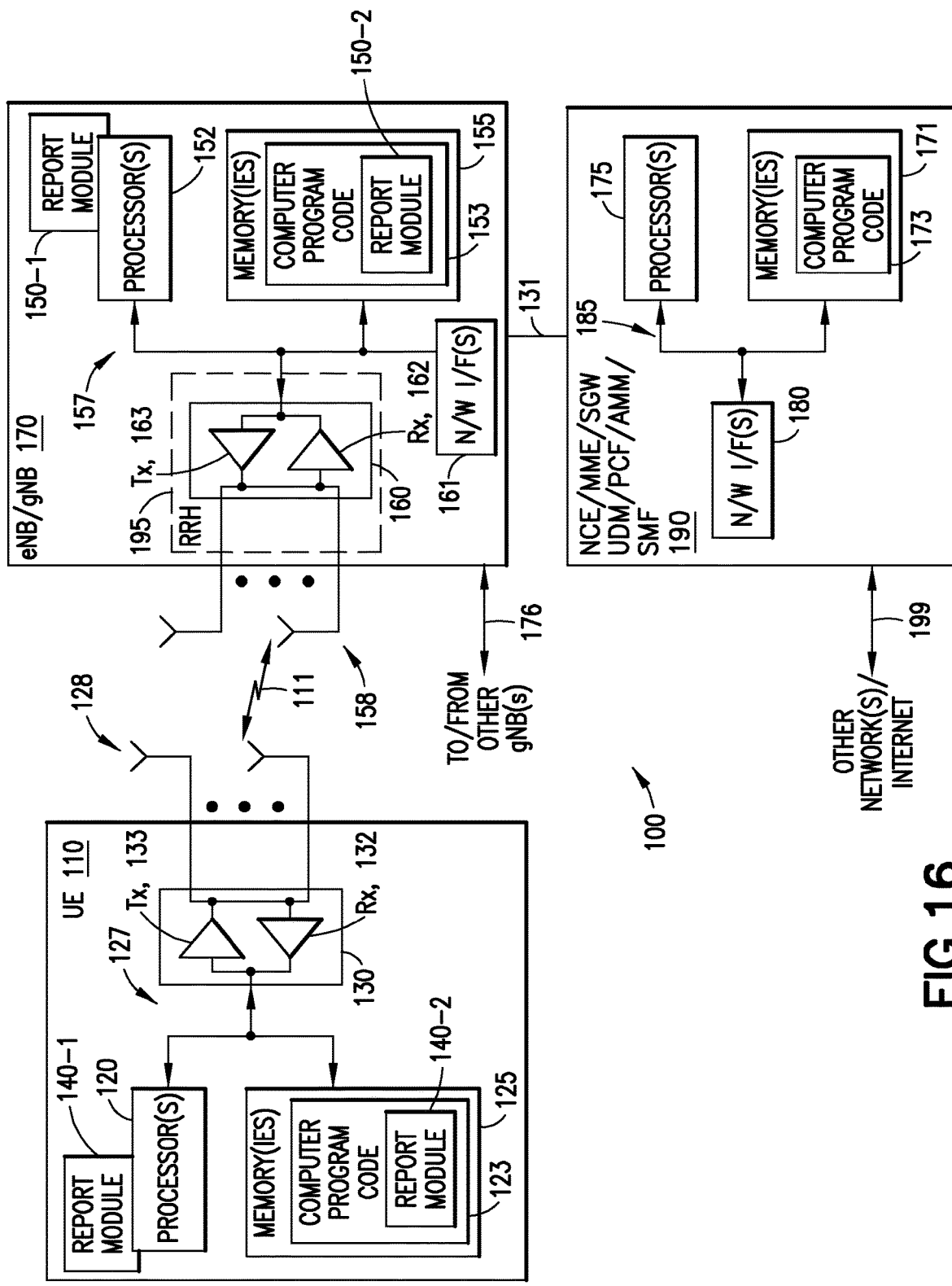
FIG. 16 shows a high level block diagram of various devices used in carrying out various aspects of the invention.

Before describing the example embodiments of the invention in further detail reference is made to FIG. 16. FIG. 16 shows a block diagram of one possible and non-limiting exemplary system in which the exemplary embodiments may be practiced.

As shown in FIG. 16, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include a Report Module 140 which is configured to perform the example embodiments of the invention as described herein. The Report Module 150 may be implemented in hardware by itself of as part of the processors and/or the computer program code of the UE 110. The Report Module 140 comprising one of or both parts 140-1 and/or 140-2, which may be implemented in a number of ways. The Report Module 140 may be implemented in hardware as Report Module 140-1, such as being implemented as part of the one or more processors 120. The Report Module 140-1 may be implemented also as an integrated circuit or through other hardware such as a programmable gate array. In another example, the Report Module 140 may be implemented as Report Module 140-2, which is implemented as computer program code 123 and is executed by the one or more processors 120. Further, it is noted that the Report Modules 140-1 and/or 140-2 are optional. For instance, the one or more memories 125 and the computer program code 123 may be configured, with the one or more processors 120, to cause the user equipment 110 to perform one or more of the operations as described herein. The UE 110 communicates with eNB/gNB 170 via a wireless link 111.

The eNB/gNB 170 (NR/5G Node B or possibly an evolved NB or LTE) is a base station (e.g., for LTE, long term evolution) that provides access by wireless devices such as the UE 110 to the wireless network 100. The eNB/gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The eNB/gNB 170 includes a Report Module 150 which is configured to perform example embodiments of the invention as described herein. The Report Module 150 may comprise one of or both parts 150-1 and/or 150-2, which may be implemented in a number of ways. The Report Module 150 may be implemented in hardware by itself or as part of the processors and/or the computer program code of the eNB/gNB 170. Report Module 150-1, such as being implemented as part of the one or more processors 152. The Report Module 150-1 may be implemented also as an integrated circuit or through other hardware such as a programmable gate array. In another example, the Report Module 150 may be implemented as Report Module 150-2, which is implemented as computer program code 153 and is executed by the one or more processors 152. Further, it is noted that the Report Modules 150-1 and/or 150-2 are optional. For instance, the one or more memories 155 and the computer program code 153 may be configured to cause, with the one or more processors 152, the eNB/gNB 170 to perform one or more of the operations as described herein. The one or more network interfaces 161 communicate over a network such as via the links 176 and 131. Two or more eNB/gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB/gNB 170 being physically in a different location from the RRH, and the one or more buses 157 could be implemented in part as fiber optic cable to connect the other elements of the eNB/gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a NCE/MME/SGW/UDM/PCF/AMM/SMF 190, which can comprise a network control element (NCE), and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility Management (AMM) functionality, and/or Session Management (SMF) functionality, and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF 190 is configurable to perform operations in accordance with example embodiments of the invention in any of an LTE, NR, 5G and/or any standards based communication technologies being performed or discussed at the time of this application.

The eNB/gNB 170 is coupled via a link 131 to the NCE/MME/SGW 190. The link 131 may be implemented as, e.g., an S1 interface. The NCE/MME/SGW 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE/MME/SGW 190 to perform one or more operations. In addition, the NCE/MME/SGW 190, as are the other devices, is equipped to perform operations of such as by controlling the UE 110 and/or eNB/gNB 170 for 5G and/or NR operations in addition to any other standards operations at the time of this application.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions and other functions as described herein to control a network device such as the UE 110, eNB/gNB 170, and/or NCE/MME/SGW 190 as in FIG. 16.

It is noted that functionality(ies), in accordance with example embodiments of the invention, of any devices as shown in FIG. 16 e.g., the UE 110 and/or eNB/gNB 170 can also be implemented by other network nodes, e.g., a wireless or wired relay node (a.k.a., integrated access and/or backhaul (IAB) node). In the IAB case, UE functionalities may be carried out by MT (mobile termination) part of the IAB node, and gNB functionalities by DU (Data Unit) part of the IAB node, respectively. These devices can be linked to the UE 110 as in FIG. 16 at least via the wireless link 111 and/or via the NCE/MME/SGW 190 using link 199 to Other Network(s)/Internet as in FIG. 16.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

As mentioned above, one main problem of the existing beam management procedure is based on two ambiguities:
A1: ambiguity about association of TCI states to TRPs or panels.
  Assuming only one beam per panel (or TRP) for FR2,
  This ambiguity is mainly for the single-DCI based multi-TRP transmission. For multi-DCI based multi-TRP transmission, "CORESETPoolIndex" is signaled in MAC-CE (FIG. 3) and TCI states signaled in the MAC-CE associated to CORESETPoolIndex are mapped to the corresponding TRP.
A2: ambiguity about UE's capability to receive any two beams simultaneously.
  Group-based beam reporting partially solves this ambiguity,
  For M-DCI based with non-ideal backhaul, this is hardly used due to backhaul delay.

Example embodiments of the invention provide solutions for the above problem for both single-/multi-DCI based multi-TRP transmission.

As similarly stated above, example embodiments of the invention at least provide an enhancement of group-based beam reporting to support multi-TRP transmission, especially for ideal/near-ideal backhaul between TRPs. (it can be used for non-ideal backhaul with certain level of time delay in beam management).

One proposal in accordance with example embodiments of the invention is an enhancement of group-based beam reporting introduced earlier. In order to remove the ambiguity A1, a new signalling procedure is proposed. Since a beam is identified by the reference signal index to be used for beam management, either SSB or CSI-RS for beam management can be used for the reference signal.

For SSB-based beam management, SSB grouping is proposed, and the SSB group is delivered to the UE via RRC configuration. This information can be included in several ways, but it is efficient to deliver this information as a part of CSI-report configuration whenever the CSI-report is associated to multi-TRP beam management. For CSI-RS-based beam management, the TCI state indicates the beam information, so an information to indicate the grouping of a TCI state or QCL-information is delivered to the UE. The problem addressed by this invention may occur when UE RX and gNB TX are equipped for hybrid beamforming. The grouping information can be included if TCI state/QCL information include any QCL-Type D relation.

If UE is configured with the grouping information and group-based beam reporting is also configured, the UE shall report the best two beams which are associated with different SSB or TCI groups.

For clarification, SSB group/TCI group corresponds to transmission beam group while UE group-based beam reporting is referring to UE reception beam group.

Further, it is noted that any reference to a beam group or beam grouping as disclosed herein with regards to example embodiments of the invention can refer to a same type of operation or can refer to any beam group operation or beam grouping operation as in accordance with example embodiments of the invention.

Another proposal in accordance with example embodiments of the invention is for the case when non-group-based beam reporting is used, and gNB is deployed with multi-TRP via non-ideal backhaul although it is also applicable with ideal backhaul. In this case, generally each TRP may configure a different CSI-report configuration for each TRP. Because the two CSI-reports are independent, the UE's ability to receive multiple beams at the same time is not known to gNB. If a gNB schedules two beams from two TRPs which cannot be received simultaneously by the UE, UE reception of PDSCHs from two TRP may fail. So, in accordance with an example embodiment of the invention, a method to associate two or more CSI-reports is provided. If two CSI-reports are associated mutually or one CSI-report is associated to another CSI-report, the beams to be reported in a CSI-report should be selected with the consideration of simultaneous reception by the UE with the beams reported in the associated CSI-report.

Enhanced Group-Beam Reporting

In this enhanced group-beam reporting in accordance with example embodiments of the invention there is proposed TCI state association to TRPs or panels.

In order to remove the A1 ambiguity, a new signalling method is proposed for indicating association of TCI states (beams) and the corresponding TRP.

In accordance with example embodiments of the invention there is provided several signalling methods for the same or different scenarios. Since beam management can be supported based on either SSB measurement or CSI-RS measurement, the options provided cover different cases.

SSB Grouping Association with TRPs

One method in accordance with example embodiments of the invention is grouping of SSBs. When group-based reporting is configured, an additional parameter (e.g. "SSB-Group") is configured to indicate which SSBs are associated to the same TRP.

In accordance with example embodiments of the invention:
  various signaling methods can be used, but bitmap can be the simplest method.
  Bitmap indicating SSB group, where "0" is group 1 and "1" is group 2, respectively.

Here, any TCI states inherited from SSBs of group 1 are associated to a TRP while other TCI states are associated to the other TRP.

The bitmap length is determined based on the ssb-PositionsInBurst in ServingCellConfigCommon, where ssb-PositionsInBurst indicates the real position of SSB transmissions among multiple candidate opportunities.

FIG. 6 shows specification information related to a bitmap of an SSBGroup. The ssb-PositionsInBurst bitmap indicates for each SSB occasion whether the SSB is transmitted or not.

If any bit of ssb-PositionsInBurst is set to 0, there is no SSB transmission in the corresponding SSB occasion. The length can be identical to the size of ssb-PositionsInBurst or the number of 1s in the bitmap. So, as shown in FIG. 6 there is among SSBs being transmitted, an additional bitmap of SSBGRoup indicating the association between active SSBs and TRPs.

In accordance with an example embodiment of the invention Channel state information reference signal resource group which is identified by TCI state group indicator or SSB groups.

TCI State Grouping Associated with TRPs

In accordance with example embodiments of the invention there can be TCI state grouping associated with TRPs, such as for CSI-RS based beam management.

When CSI-RS based beam management is used, the following method is used. If QCL-Info is set to "type-D" (UE RX beamforming), an additional parameter for grouping TCI states (e.g. "tciGroupId"={g1, g2}) can be included to indicate what TCI group (i.e., TRP) is associated with the QCL information. This parameter can be part of either QCL-Info IE (example 1) or TCI-State IE (example 2) without functional difference.

The TCI states in a group can be considered as TCI states used for transmission from a TRP. And, if two TCI states are configured with different groupID, then they are used for transmission from different TRPs or panels, and they can be used for transmission simultaneously.

Though this information can be included without QCL type-D association for other purposes, the problem stated above is only related to the case when QCL-type D is configured. FIG. 7, FIG. 8, and FIG. 9 each shows an example of specification information for QCL-type D association.

For multi-DCI based multi-TRP transmission, because "CORESETPoolIndex (=0 or 1)" is already defined to identify the associated TRP, this parameter can be used instead of defining a new RRC parameter. There is no fundamental different between using a new parameter or the existing parameter.

UE's Capability of Receiving Two TCI States Simultaneously

In a 3GPP release at the time of this application, because there is no distinction of TRP when reporting a beam group, there is a possibility that the UE reports two beams associated to a single TRP, and they cannot be transmitted simultaneously. So, only one TRP can have the beam available to schedule a transmission.

If example embodiments of the invention as above are adopted there can be a new association of TCI state with TRP groups. In this regard the UE can select two TCI states from different TRPs when group-based reporting is enabled.

One procedure in accordance with example embodiments of the invention is as follows:
  The TCI to TRP association is provided via methods described previously;
  The gNB can configure group-based beam reporting, and according to the selected option, a parameter is configured to trigger "TCI group specific reporting";
  When UE feedback group-based beam reporting:
    Option 1: if SSB grouping is used for the group-based reporting (e.g., SSBGroup is configured), and the UE should select one TCI per SSB Group when reporting a pair of TCI states. (In example 1),
    Option 2: if TCI state grouping is used (e.g. tciGroupID is configured for QCL-Info or TCI-State), and the UE is requested to consider TCI group specific reporting (e.g. tciGroup-specific is configured), the UE should select one TCI per TCI group,
    Option 3: if CORESETPoolIndex is configured, and group-based reporting with CORESETPool-specific is configured, the UE should select one TCI per CORESETPoolIndex;
  Based on the UE's beam report, gNB may use the reported TCI state for the corresponding TRP;
  Since group-based reporting will be sent to a TRP, the TRP received the beam reporting shall share this information to the other TRP, thus this method is more suitable for ideal backhaul between TRPs.

FIG. 10 shows an example of specification information options for group based beam reporting in accordance with example embodiments of the invention. More specifically, FIG. 10 shows options 2 and 3 as above.

In a further procedure in accordance with example embodiments of the invention if the UE cannot find any pair of beams from two groups that can be simultaneously transmitted, the UE may select two beams from a single group, and the gNB may interpret this that there is no beam pair for multi-TRP operation. The gNB may transmit a PDSCH from a single TRP, and it can update CSI-RS configuration for beam management with the other combinations of beams.

Figure 11:
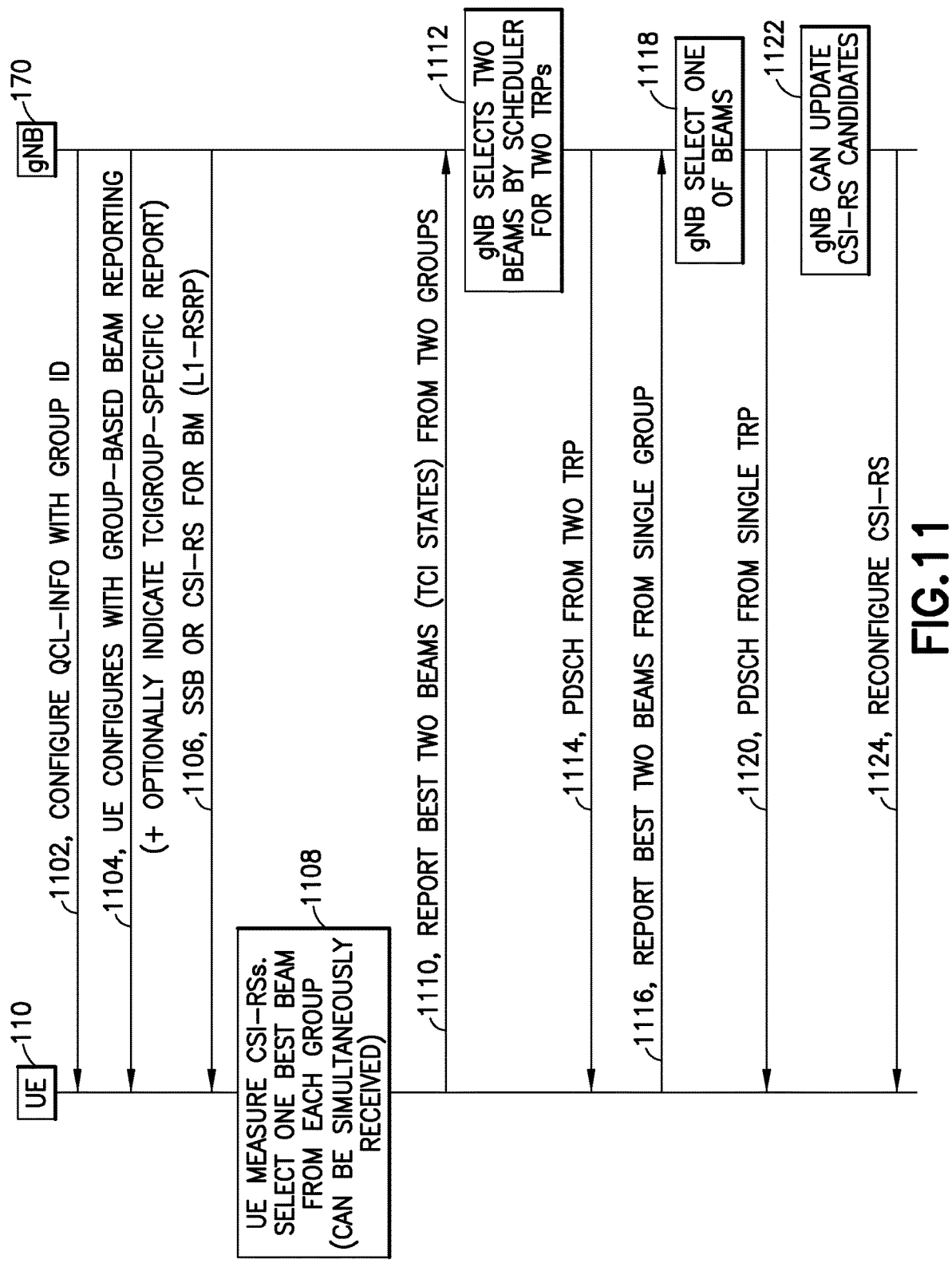
FIG. 11 shows a flow chart of one proposed method in accordance with example embodiments of the invention.

FIG. 11 is the diagram of one proposed method in accordance with example embodiments of the invention. As shown in FIG. 11 there is communications between a UE 110 and a gNB 170. As shown in step 1102 of FIG. 11 there is information from the gNB 170 for configuring QCL-info with group ID. As shown in step 1104 of FIG. 11 there is information from the gNB 170 for configuring UE 110 with group-based beam reporting, with option of indicating a tcigroup-specific report. Then as shown in step 1106 of FIG. 11 there is information from the gNB 170 for SSB or CSI-RS for BM (L1-RSRP). As shown in step 1108 of FIG. 11 the UE 110 measures CSI-RSs, and selects a best beam from each group, such as for beams that can be simultaneously received. In step 1110 of FIG. 11 there is information from the UE 110 to the gNB 170 reporting the best two beams (TCI states) from two groups. As shown in step 1112 of FIG. 11 the gNB 170 selects the beams for scheduling by a scheduler for two TRPs. As shown in step 1114 of FIG. 11 there is communicated from the gNB 170 PDSCH from two TRPs. Then as shown in step 1116 of FIG. 11 there is reported by the UE 110 best two beams from a single group. As shown in step 1118 of FIG. 11 the gNB 170 selects one of the beams; As shown in step 1120 of FIG. 11 the gNB 110 sends towards the UE 110 PDSCH from a single TRP. As shown in step 1122 of FIG. 11 the gNB 170 can update CSI-RS candidates. Then as shown in step 1124 of FIG. 11 the gNB sends towards the UE 110 information to reconfigure CSI-RS.

Enhanced Beam Reporting for Multi-TRP Operation with Association.

Group-based beam reporting is more suitable for multi-TRP operation with ideal back-haul. Since the report is sent to a single TRP, the gNB shall share the UE's feedback information across the TRPs via backhaul signalling. However, for the non-ideal backhaul case, independent feedback of beam management per TRP is a more suitable approach.

So, the UE can be configured with two CSI-report configurations for two TRPs with separate resource configurations.

Non-group based beam reporting is used for this case, and the UE shall avoid selecting any RSs that cannot be received simultaneously.

FIG. 12 shows a CSI Report Configuration in accordance with an example embodiment of the invention. In this regard, the UE can be configured with one CSI-ReportConfig per TRP, and two CSI-ReportConfigs are associated with the RRC parameter "associatedReport" such that:

If a CSI-ReportConfig is associated with another CSI-ReportConfig (e.g., configured with "associatedReport" including a CSI-ReportConfigID), the UE shall derive CSI report with the assumption of,
  This report is associated with another report indicated by the parameter "associatedReport", and/or
  UE only selects SSBs or CSI-RSs to be reported among the RSs which can be received simultaneously with the reported (or to be reported) RS for the other CSI-ReportConfig associated with the report;
Group-based beam reporting is not supported.

The number of associated reports can be extended for more than one report such that:

If UE is requested for reporting a larger number of RSs than the actual number of RSs to be reported, RSRP delta for unavailable RS shall be set to maximum (e.g., set to 1111);

3GPP specifies that, if the number of reported RS is more than one, differential encoding is applied for signaling RSRP value (4 bit). RSRP delta=1111 may represent "unavailable" in this case (see below example).

Figure 13:
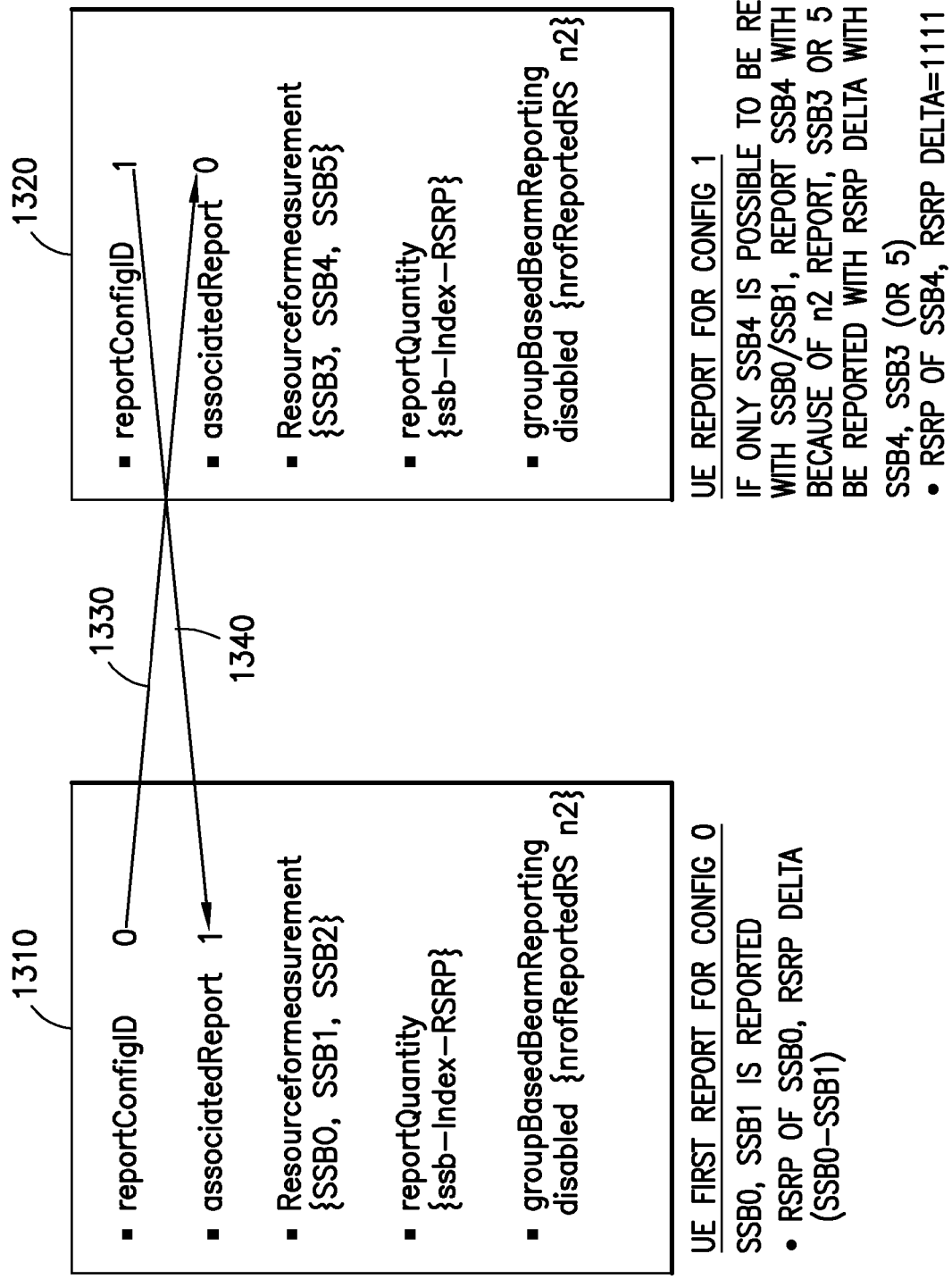
FIG. 13 shows an example of combined reportConfig and UE operation with the combined report.

FIG. 13 shows the example of the beam report operation when two CSI-RS reports are associated. As shown with the lines 1330 and 1340 of FIG. 13 two configurations reportConfig 0 and 1 are mutually associated and referred. When the UE determines the reported RSs for each report, simultaneous reception shall be considered.

So, for example, SSB0 and SSB1 and their RSRP are reported by reportConfig 0 which can be received simultaneously with any SSBs in reportConfig 1.

Then, for reportConfig 1, the reported RS shall be one that can be received simultaneously with SSB0 and SSB1.

If only SSB4 is possible to be received, the UE shall report SSB4 for the reportConfig 1.

There is a possibility that the configured number of RSs are more than the number of RS to be reported. For example, if the number of RSs to be reported is 2 for reportConfig 1 but only SSB4 can be reported, the report for config 1 may include SSB4 and additionally SSB3 (or SSB5), RSRP of SSB4 and deltaRSRP (1111). The largest delatRSRP can implicitly indicate "not available".

The report of two RSs is as follows: $1^{st}$ SSB Index, RSRP of $1^{st}$ SSB, $2^{nd}$ SSB Index, delta RSRP of $2^{nd}$ SSB from RSRP of $1^{st}$ SSB.

The concept of associating a report configuration with another report configuration can be widely used for CSI reporting for multi-TRP operation not only for beam reporting but also for CSI computation.

Figure 14:
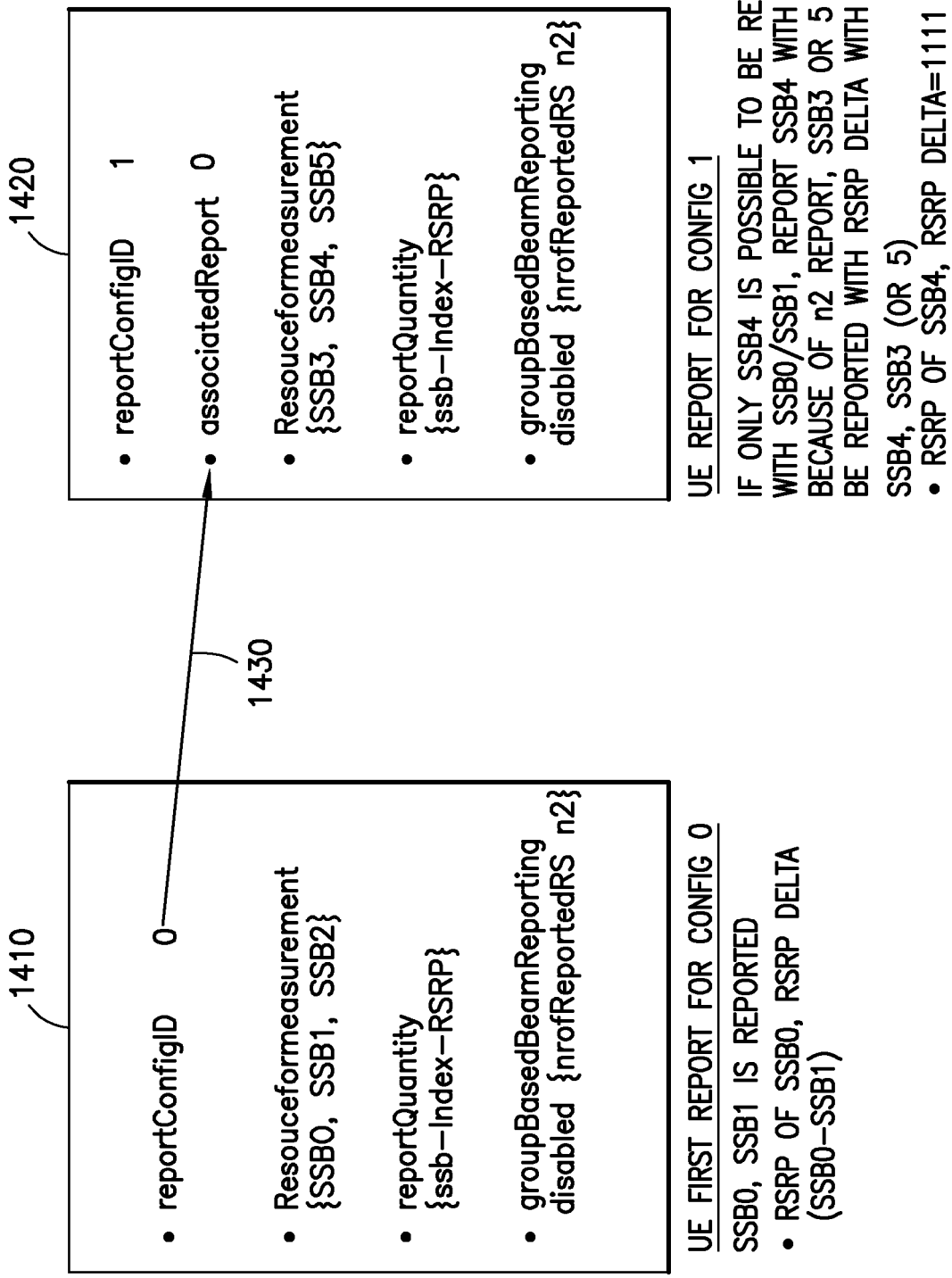
FIG. 14 shows another example of combined reportConfig and UE operation with the combined report.

FIG. 14 shows the example of another option. This option is to configure a one-way association to a CSI-report rather than mutual association. For example, as shown with line 1430 of FIG. 14 only CSI-report 1 is configured with association with CSI-report 0. Then, after reporting of CSI-report 0, when determining feedback about CSI-report 1, UE shall take into account the ability of simultaneous reception of the RSs to be reported with the reported RS for CSI-report 0. Apart from the priority, this option is the same as the mutual association.

In addition to the signalling update, UE mandatory operation of determining RSs to be reported shall be specified as discussed herein.

Figure 15:
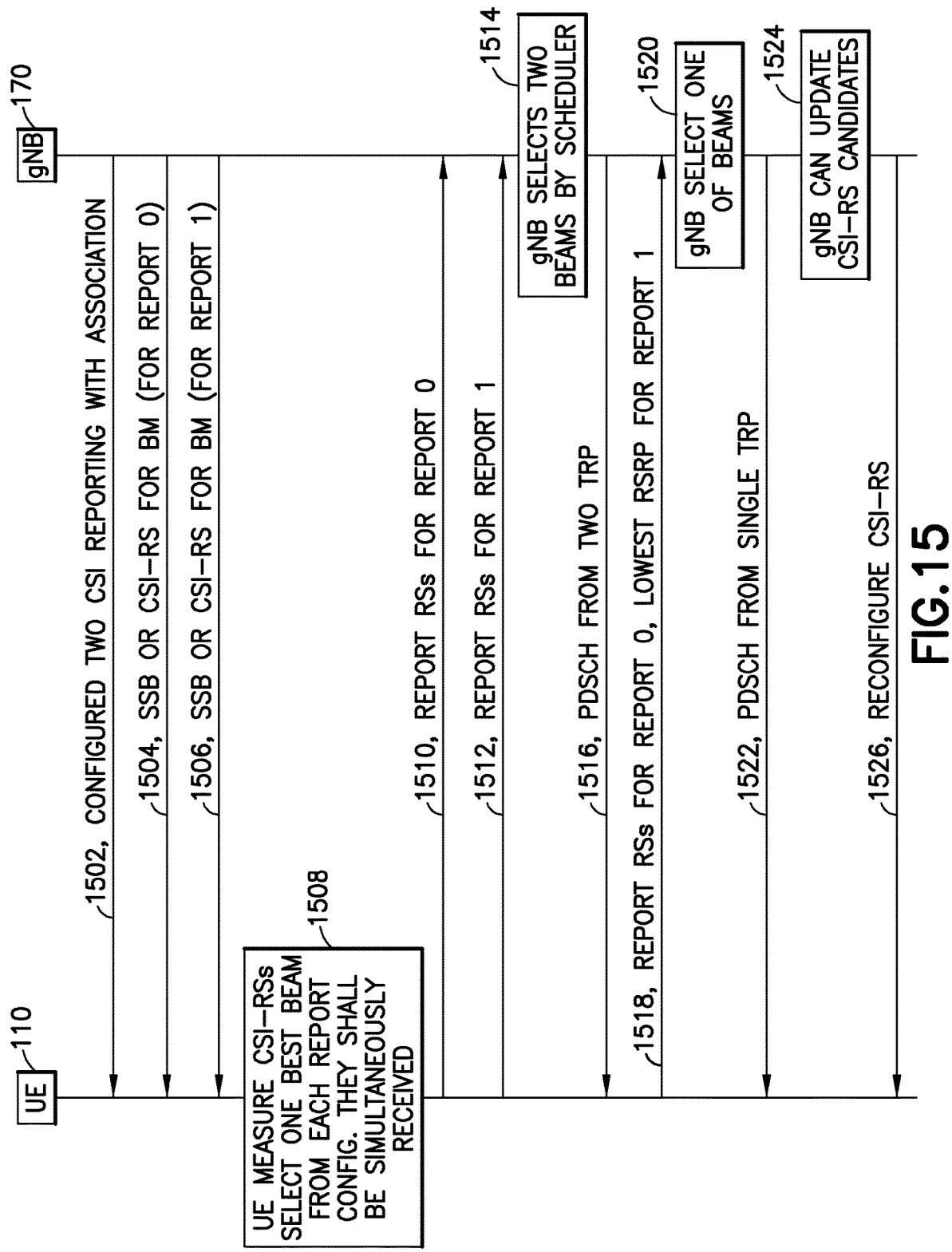
FIG. 15 shows a flow chart of another proposed method in accordance with example embodiments of the invention.

FIG. 15 shows a flow chart of another proposed method in accordance with example embodiments of the invention. As shown in FIG. 15 there is communication between the UE 110 and the gNB 170. As shown in step 1502 of FIG. 15 there is information from the gNB 170 to the UE 110 indicating configured two CSI reporting with association. As shown in step 1504 of FIG. 15 there is from the gNB 170 to the UE 110 an indication of SSB or CSI-RS for BM, such as for report 0. As shown in step 1506 of FIG. 15 the gNB 170 sends towards the UE 110 an indication of SSB or CSI-RS for BM, such as for report 1. As shown in step 1508 of FIG. 15 the UE 110 measures CSI-RSs, and selects one best beam from each reporting configuration, that shall be simultaneously received. In step 1510 of FIG. 15 there is sent from the UE 110 towards the gNB 170 Report RSs for report 0. Then in step 1512 of FIG. 15 there is sent from the UE 110 towards the gNB 170 Report RSs for report 1. As shown in step 1514 of FIG. 15 the gNB 170 selects two beams by scheduler. In step 1516 of FIG. 15 there is sent from the gNB 170 towards the UE 110 PDSCH from two TRP. As shown in step 1518 of FIG. 15 there is sent from the UE 110 towards the gNB 170 information to report RSs for report 0, and lowest RSRP for report 1. As shown in step 1520 of FIG. 15 the gNB 170 selects one of beams. As shown in step 1522 of FIG. 15 there is sent from the gNB 170 towards the UE 110 PDSCH from single TRP. As shown in step 1524 of FIG. 15 the gNB 170 can update CSI-RS candidates. Then as shown in step 1526 of FIG. 15 there is sent from the gNB 170 towards the UE 110 an indication to reconfigure CSI-RS.

FIG. 17, FIG. 18, FIG. 19, FIG. 20, FIG. 21, and FIG. 22 each show a method in accordance with example embodiments of the invention which may be performed by an apparatus, such as apparatus as in FIG. 16.

Figure 17:
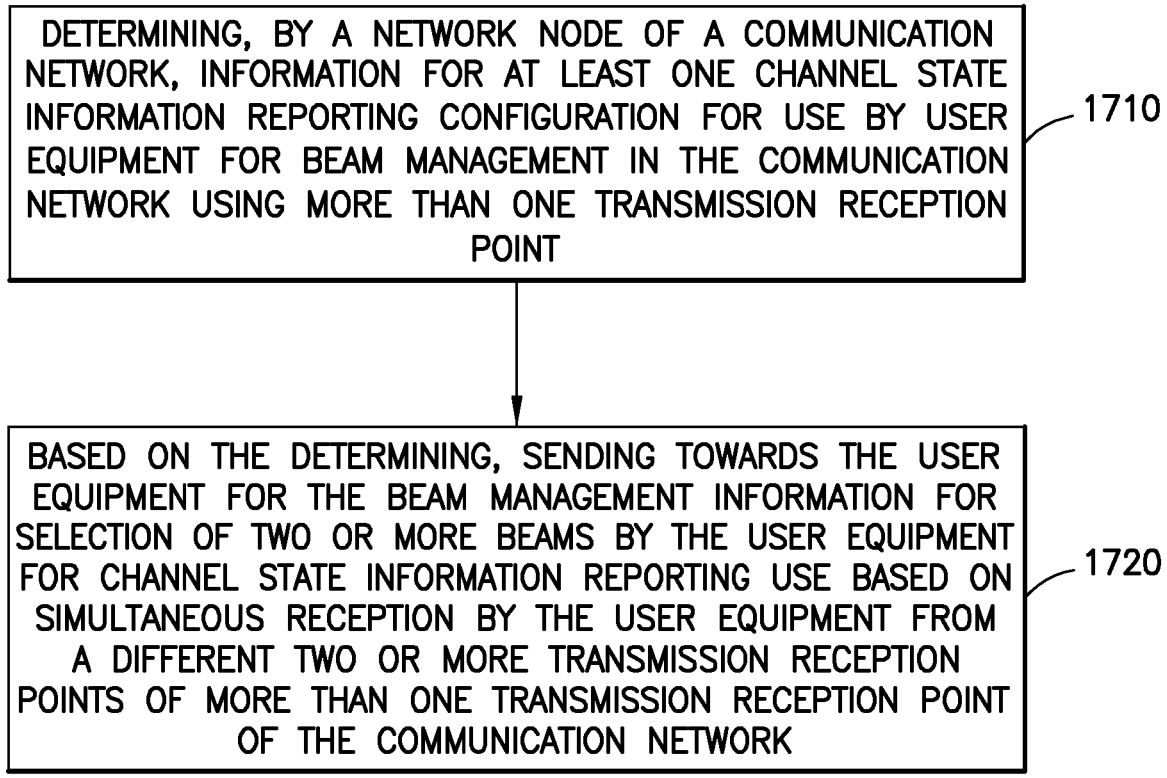

FIG. 17 illustrates operations which may be performed by a device such as, but not limited to, a network device (e.g., the eNB/gNB 170 as in FIG. 16). As shown in step 1710 of FIG. 17 there is determining, by a network node of a communication network, information for at least one channel state information reporting configuration for use by user equipment for beam management in the communication network using more than one transmission reception point. Then as shown in step 1720 of FIG. 7 there is, based on the determining, sending towards the user equipment for the beam management information for selection of two or more beams by the user equipment for channel state information reporting use based on simultaneous reception by the user equipment from a different two or more transmission reception points of more than one transmission reception point of the communication network.

In accordance with the example embodiments as described in the paragraph above, wherein the information comprises an indication of two or more channel state information report configurations, and wherein each of the two or more channel state information reporting configurations is for a different reception point of the two or more transmission reception points.

In accordance with the example embodiments as described in the paragraphs above, wherein the information comprises an indication of association of two or more channel state information report configurations with a different channel state information report configuration.

In accordance with the example embodiments as described in the paragraphs above, wherein the selection is to be based on at least the association indicating a pair of beams capable for use with simultaneous reception by the user equipment from the different two or more transmission reception points.

In accordance with the example embodiments as described in the paragraphs above, wherein the information comprises at least one reference signal for the at least one channel state information report configuration.

In accordance with the example embodiments as described in the paragraphs above, wherein based on the at least one channel state information reporting configuration of the information not being associated with a different channel state information report configuration in the information the selection by the user equipment is based on a capability of simultaneous reception of reference signals to be reported with the reference signal.

In accordance with the example embodiments as described in the paragraphs above, wherein the beam management is based on more than one channel state information reference signal resources.

In accordance with the example embodiments as described in the paragraphs above, wherein the two or more beams to be selected is based on the channel state information reference signal.

A non-transitory computer-readable medium (Memory(ies) 155 as in FIG. 16 storing program code (Computer Program Code 153 and/or Report Module 150-2 as in FIG. 16), the program code executed by at least one processor (Processor(s) 152 and/or Report Module 150-1 as in FIG. 16) to perform the operations as at least described in the paragraphs above.

In accordance with an example embodiment of the invention as described above there is an apparatus comprising: means for determining (one or more buses 157; Memory(ies) 155; Computer Program Code 153 and/or Report Module 150-2; and Processor(s) 152 and/or Report Module 150-1 as in FIG. 16), by a network node (eNB/gNB 170 as in FIG. 16), by a network node (eNB/gNB 170 as in FIG. 16) of a communication network (Network 100 as in FIG. 16), information for at least one channel state information reporting configuration for use by user equipment (UE 110 as in FIG. 16) for beam management in the communication network using more than one transmission reception point; and means, based on the determining, for sending (one or more buses 157; Memory(ies) 155; Computer Program Code 153 and/or Report Module 150-2; and Processor(s) 152 and/or Report Module 150-1 as in FIG. 16), by a network node (eNB/gNB 170 as in FIG. 16) towards the user equipment for the beam management information for selection of two or more beams by the user equipment for channel state information reporting use based on simultaneous reception by the user equipment from a different two or more transmission reception points of more than one transmission reception point of the communication network.

Figure 18:
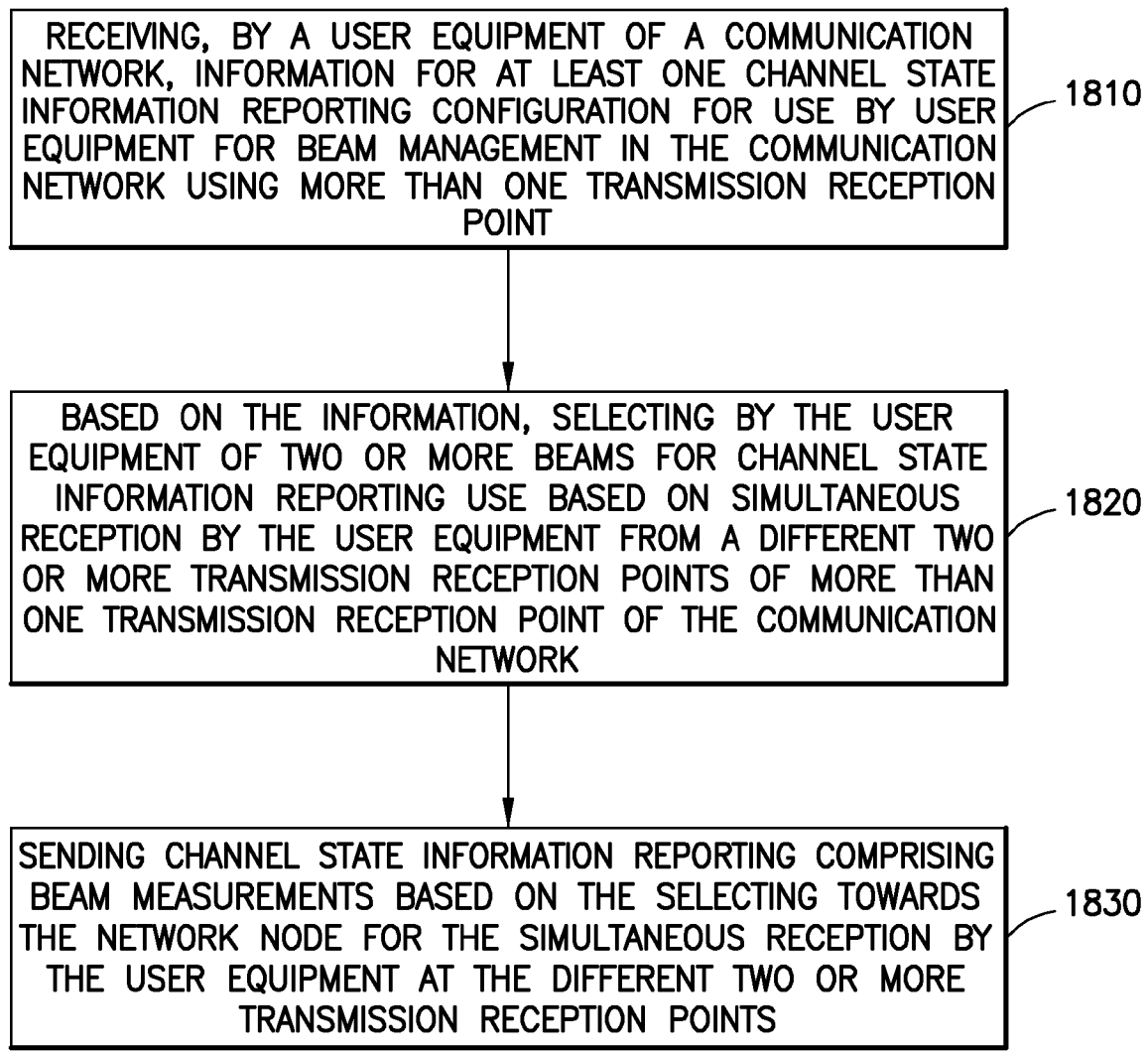

FIG. 18 illustrates operations which may be performed by a device such as, but not limited to, a user equipment device (e.g., the UE 110 as in FIG. 16). As shown in step 1810 of FIG. 18 there is receiving, by a user equipment of a communication network, information for at least one channel state information reporting configuration for use by user equipment for beam management in the communication network using more than one transmission reception point. As shown in step 1820 of FIG. 18 there is, based on the information, selecting by the user equipment of two or more beams for channel state information reporting use based on simultaneous reception by the user equipment from a different two or more transmission reception points of more than one transmission reception point of the communication network. Then as shown in step 1830 of FIG. 18 there is sending channel state information reporting comprising beam measurements based on the selecting towards the network node for the simultaneous reception by the user equipment at the different two or more transmission reception points.

In accordance with the example embodiments as described in the paragraph above, wherein the information comprises an indication of two or more channel state information report configurations, and wherein each of the two or more channel state information reporting configurations is for a different reception point of the two or more transmission reception points.

In accordance with the example embodiments as described in the paragraphs above, wherein the information comprises an indication of association of two or more channel state information report configurations with a different channel state information report configuration.

In accordance with the example embodiments as described in the paragraphs above, wherein the selection is to be based on at least the association indicating a pair of beams capable for use with simultaneous reception by the user equipment from the different two or more transmission reception points.

In accordance with the example embodiments as described in the paragraphs above, wherein the beam management is based on more than one channel state information reference signal resources.

In accordance with the example embodiments as described in the paragraphs above, wherein the two or more beams to be selected is based on the channel state information reference signal.

In accordance with the example embodiments as described in the paragraphs above, wherein the information comprises an indication of association of two or more channel state information report configurations with a different channel state information report configuration, and wherein each of the two or more channel state information reporting configurations is for a different reception point of the two or more transmission reception points.

A non-transitory computer-readable medium (Memory(ies) 125 as in FIG. 16 storing program code (Computer Program Code 123 and/or Report Module 140-2 as in FIG. 16), the program code executed by at least one processor (Processor(s) 120 and/or Report Module 140-1 as in FIG. 16) to perform the operations as at least described in the paragraphs above.

In accordance with an example embodiment of the invention as described above there is an apparatus comprising: means for receiving (one or more buses 127; Computer Program Code 123 and/or Report Module 140-2; Processor(s) 120 and/or Report Module 140-1; and Processor(s) 120 and/or Report Module 140-1 as in FIG. 16), by a user equipment (UE 110 as in FIG. 16) of a communication network (Network 100 as in FIG. 16), information for at least one channel state information reporting configuration for use by user equipment for beam management (one or more buses 127; Computer Program Code 123 and/or Report Module 140-2; Processor(s) 120 and/or Report Module 140-1; and Processor(s) 120 and/or Report Module 140-1 as in FIG. 16) in the communication network using more than one transmission reception point; means, based on the information, for selecting (one or more buses 127; Computer Program Code 123 and/or Report Module 140-2; Processor(s) 120 and/or Report Module 140-1; and Processor(s) 120 and/or Report Module 140-1 as in FIG. 16) by the user equipment of two or more beams for channel state information reporting use based on simultaneous reception by the user equipment from a different two or more transmission reception points of more than one transmission reception point of the communication network; and means for sending (one or more buses 127; Computer Program Code 123 and/or Report Module 140-2; Processor(s) 120 and/or Report Module 140-1; and Processor(s) 120 and/or Report Module 140-1 as in FIG. 16) channel state information reporting comprising beam measurements based on the selecting towards a network node (eNB/gNB 170 as in FIG. 16) for the simultaneous reception by the user equipment at the different two or more transmission reception points.

In the example aspect of the invention according to the paragraph above, wherein at least the means for receiving, selecting, and sending comprises non-transitory computer-readable medium (Memory(ies) 125 as in FIG. 16 storing program code (Computer Program Code 123 and/or Report Module 140-2 as in FIG. 16), the program code executed by at least one processor (Processor(s) 120 and/or Report Module 140-1 as in FIG. 16)

Figure 19:
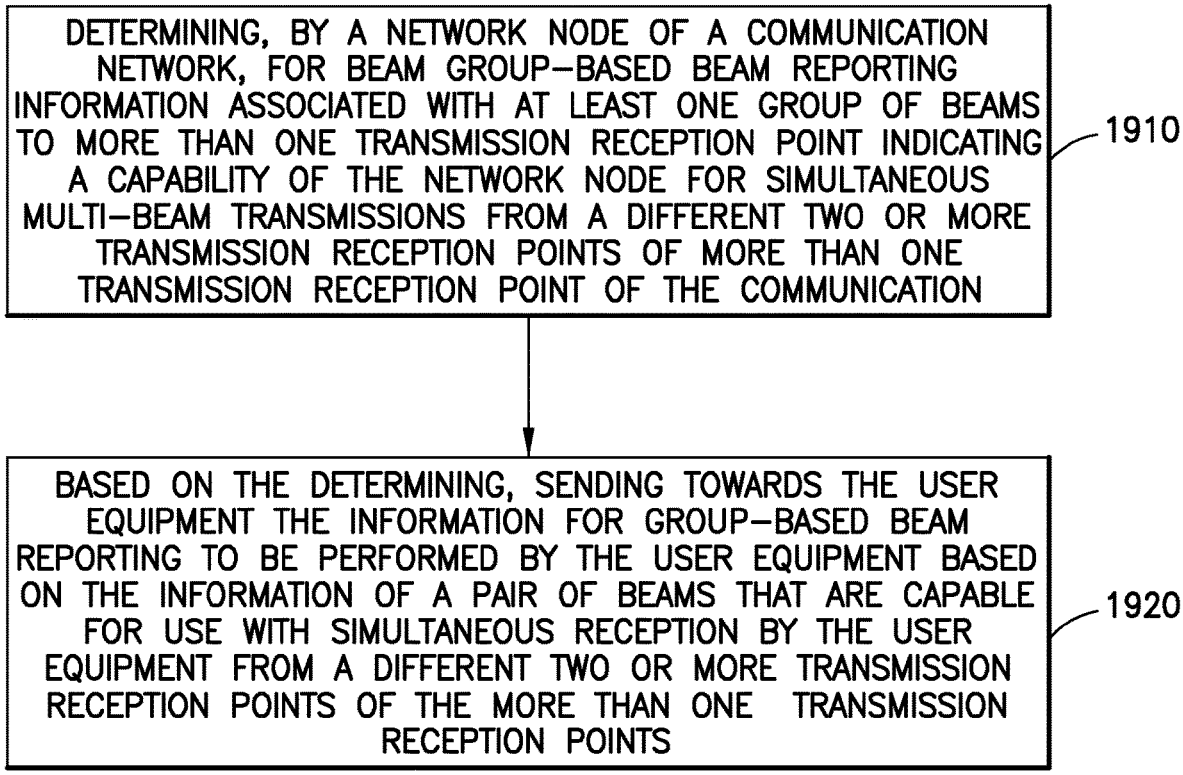

FIG. 19 illustrates operations which may be performed by a device such as, but not limited to, a network device (e.g., the eNB/gNB 170 as in FIG. 16). As shown in step 1910 of FIG. 19 there is determining, by a network node of a communication network, for beam group-based beam reporting information associated with at least one group of beams to more than one transmission reception point indicating a capability of the network node for simultaneous multi-beam transmissions from a different two or more transmission reception points of more than one transmission reception point of the communication network. Then as shown in step 1920 of FIG. 19 there is, based on the determining, sending towards the user equipment the information for group-based beam reporting to be performed by the user equipment based on the information of a pair of beams that are capable for use with simultaneous reception by the user equipment from a different two or more transmission reception points of the more than one transmission reception points.

In accordance with the example embodiments as described in the paragraph above, wherein the group-based beam reporting of the pair of beams is based on a channel state information report configuration of two or more channel state information report configurations of the information associated with the at least one group of beams for use with simultaneous reception by the user equipment.

In accordance with the example embodiments as described in the paragraphs above, wherein the group-based beam reporting of the pair of beams is to identify the channel state information report configuration based on the channel state information reference signal.

In accordance with the example embodiments as described in the paragraphs above, wherein the channel state information reference signal is associated with at least one of transmission configuration indicator state groups or Synchronization Signal Block groups.

In accordance with the example embodiments as described in the paragraphs above, wherein the at least one of transmission configuration indicator state groups or Synchronization Signal Block groups is using quasi-colocation information associated with at least one reference signal.

In accordance with the example embodiments as described in the paragraphs above, wherein the information comprises at least one beam group identifier is included as a part of the quasi-coloration information of the transmission configuration indication state.

In accordance with the example embodiments as described in the paragraphs above, wherein the quasi-colocation information is related to a spatial reception parameter.

A non-transitory computer-readable medium (Memory(ies) 155 as in FIG. 16 storing program code (Computer Program Code 153 and/or Report Module 150-2 as in FIG. 16), the program code executed by at least one processor (Processor(s) 152 and/or Report Module 150-1 as in FIG. 16) to perform the operations as at least described in the paragraphs above.

In accordance with an example embodiment of the invention as described above there is an apparatus comprising: means for determining (one or more buses 157; Memory(ies) 155; Computer Program Code 153 and/or Report Module 150-2; and Processor(s) 152 and/or Report Module 150-1 as in FIG. 16), by a network node (eNB/gNB 170 as in FIG. 16) of a communication network, for beam group-based beam reporting information associated with at least one group of beams to more than one transmission reception point indicating a capability of the network node for simultaneous multi-beam transmissions from a different two or more transmission reception points of more than one transmission reception point of the communication network; and means, based on the determining, sending (one or more buses 157; Memory(ies) 155; Computer Program Code 153 and/or Report Module 150-2; and Processor(s) 152 and/or Report Module 150-1 as in FIG. 16) towards user equipment (UE 110 as in FIG. 16) the information for group-based beam reporting to be performed by the user equipment based on the information of a pair of beams that are capable for use with simultaneous reception by the user equipment from a different two or more transmission reception points of the more than one transmission reception points.

In the example aspect of the invention according to the paragraph above, wherein at least the means for determining and sending comprises non-transitory computer-readable medium (Memory(ies) 155 as in FIG. 16 storing program code (Computer Program Code 153 and/or Report Module 150-2 as in FIG. 16), the program code executed by at least one processor (Processor(s) 152 and/or Report Module 150-1 as in FIG. 16).

Figure 20:
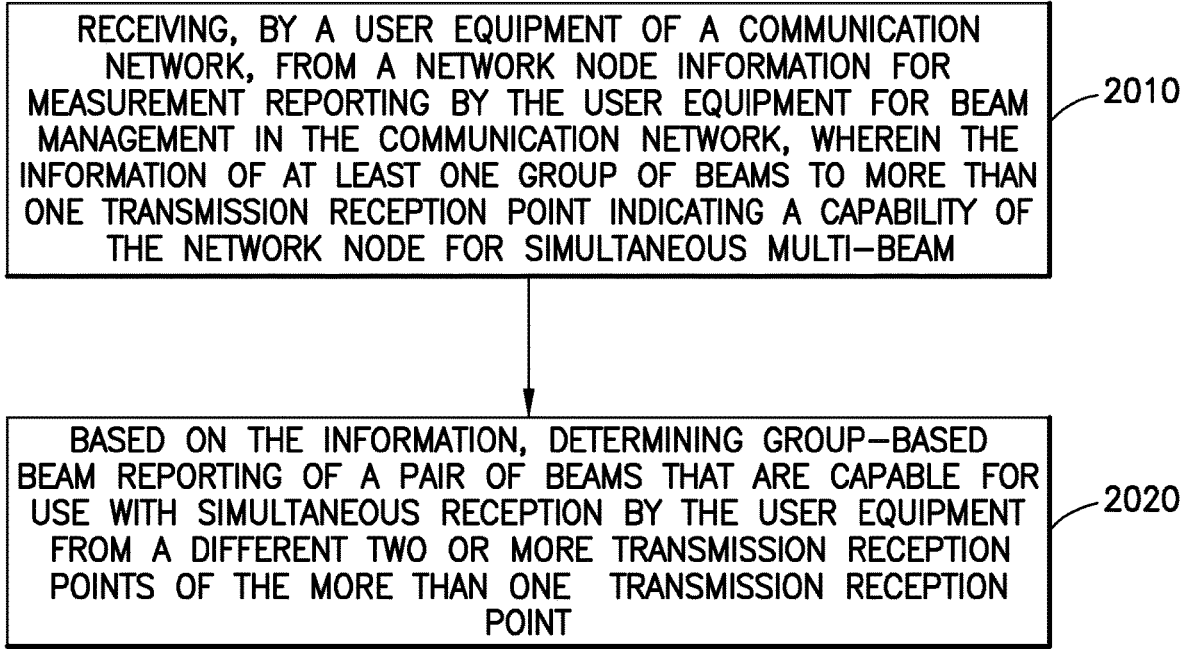

FIG. 20 illustrates operations which may be performed by a device such as, but not limited to, a user equipment device (e.g., the UE 110 as in FIG. 16). As shown in step 2010 of FIG. 18 there is receiving, by a user equipment of a communication network, from a network node information for measurement reporting by the user equipment for beam management in the communication network, wherein the information of at least one group of beams to more than one transmission reception point indicating a capability of the network node for simultaneous multi-beam transmissions from a different two or more transmission reception points of more than one transmission reception point of the communication network. Then as shown in step 2020 of FIG. 20 there is, based on the information, determining group-based beam reporting of a pair of beams that are capable for use with simultaneous reception by the user equipment from a different two or more transmission reception points of the more than one transmission reception point.

In accordance with the example embodiments as described in the paragraph above, wherein the group-based beam reporting of the pair of beams is based on a channel state information report configuration of two or more channel state information report configurations of the information associated with the at least one group of beams for use with simultaneous reception by the user equipment.

In accordance with the example embodiments as described in the paragraphs above, wherein the group-based beam reporting of the pair of beams is to identify the channel state information report configuration based on the channel state information reference signal.

In accordance with the example embodiments as described in the paragraphs above, wherein the channel state information reference signal is associated with at least one of transmission configuration indicator state groups or Synchronization Signal Block groups.

In accordance with the example embodiments as described in the paragraphs above, wherein the at least one of transmission configuration indicator state groups or Synchronization Signal Block groups is using quasi-colocation information associated with at least one reference signal.

In accordance with the example embodiments as described in the paragraphs above, wherein the information comprises at least one beam group identifier is included as a part of the quasi-colocation information of the transmission configuration indication state.

In accordance with the example embodiments as described in the paragraphs above, wherein the quasi-colocation information is related to a spatial reception parameter.

A non-transitory computer-readable medium (Memory(ies) 125 as in FIG. 16 storing program code (Computer Program Code 123 and/or Report Module 140-2 as in FIG. 16), the program code executed by at least one processor (Processor(s) 120 and/or Report Module 140-1 as in FIG. 16) to perform the operations as at least described in the paragraphs above.

In accordance with an example embodiment of the invention as described above there is an apparatus comprising: means for receiving (one or more buses 127; Computer Program Code 123 and/or Report Module 140-2; Processor(s) 120 and/or Report Module 140-1; and Processor(s) 120 and/or Report Module 140-1 as in FIG. 16), by a user equipment (UE 110 as in FIG. 16) of a communication network (Network 100 as in FIG. 16), from a network node (eNB/gNB 170 as in FIG. 16) information for measurement reporting by the user equipment for beam management in the communication network, wherein the information of at least one group of beams to more than one transmission reception point indicating a capability of the network node for simultaneous multi-beam transmissions from a different two or more transmission reception points of more than one transmission reception point of the communication network; and means, based on the information, for determining (one or more buses 127; Computer Program Code 123 and/or Report Module 140-2; Processor(s) 120 and/or Report Module 140-1; and Processor(s) 120 and/or Report Module 140-1 as in FIG. 16) group-based beam reporting of a pair of beams that are capable for use with simultaneous reception by the user equipment from a different two or more transmission reception points of the more than one transmission reception point.

In the example aspect of the invention according to the paragraph above, wherein at least the means for receiving and determining comprises non-transitory computer-readable medium (Memory(ies) 125 as in FIG. 16 storing program code (Computer Program Code 123 and/or Report Module 140-2 as in FIG. 16), the program code executed by at least one processor (Processor(s) 120 and/or Report Module 140-1 as in FIG. 16)

Figure 21:
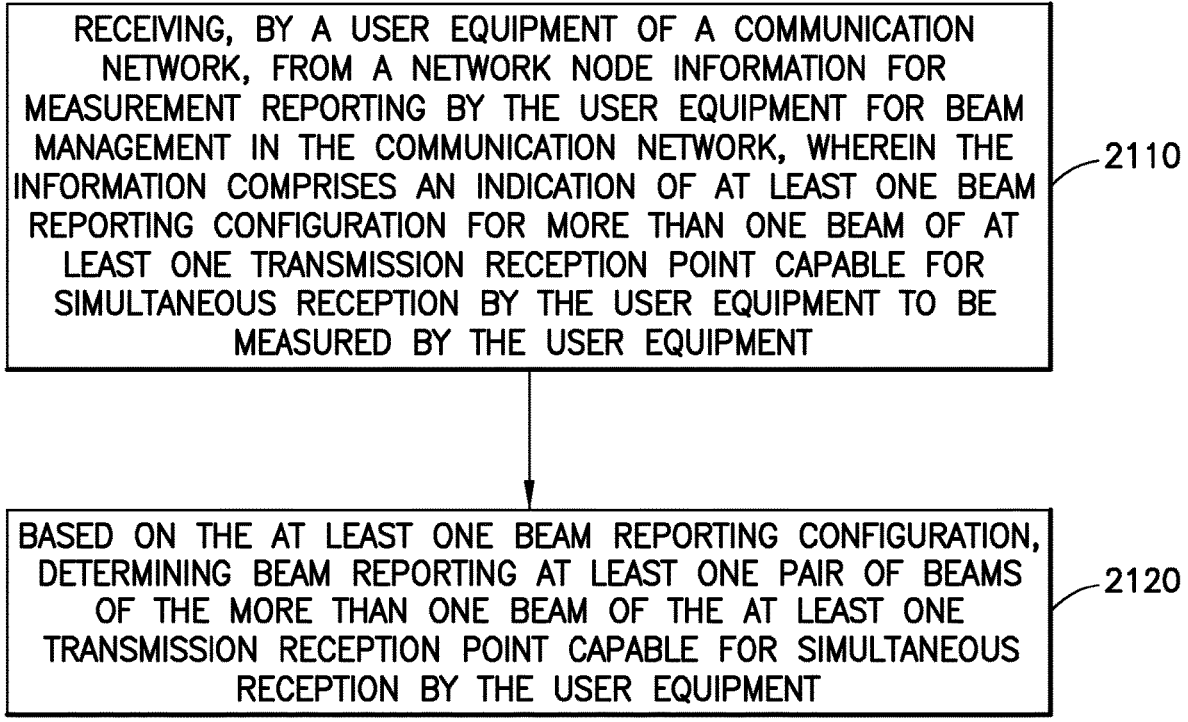

FIG. 21 illustrates operations which may be performed by a device such as, but not limited to, a user equipment device (e.g., the UE 110 as in FIG. 16). As shown in step 2110 of FIG. 21 there is receiving, by a user equipment of a communication network, from a network node information for measurement reporting by the user equipment for beam management in the communication network, wherein the information comprises an indication of at least one beam reporting configuration for more than one beam of at least one transmission reception point capable for simultaneous reception by the user equipment to be measured by the user equipment. Then as shown in step 2120 of FIG. 21 there is based on the at least one beam reporting configuration, determining beam reporting at least one pair of beams of the more than one beam of the at least one transmission reception point capable for simultaneous reception by the user equipment.

In accordance with the example embodiments as described in the paragraph above, wherein the at least one beam reporting configuration comprises an indication of association of more than one beam with at least one of two or more transmission reception points or association of more than one beam with a same transmission reception point of the at least one transmission reception point.

In accordance with the example embodiments as described in the paragraphs above, wherein the information comprises each beam of the more than one beam is identified by a reference signal associated with one of a channel state information reference signal or a Synchronization Signal Block.

In accordance with the example embodiments as described in the paragraphs above, wherein based on the reference signal the user equipment is selecting a best two beams of the more than one beam from different groups of at least one of a synchronization signal block group or a transmission configuration indication group or from two or more transmission reception points.

In accordance with the example embodiments as described in the paragraphs above, wherein an indication of the at least one of a synchronization signal block group or a transmission configuration indication group is received by the user equipment via a radio resource control configuration associated with the information.

In accordance with the example embodiments as described in the paragraphs above, wherein the at least one of a synchronization signal block group or a transmission configuration indication group identify which synchronization signal block group or transmission configuration indication group or which at least one transmission reception point the reference signal is associated with.

In accordance with the example embodiments as described in the paragraphs above, wherein the at least one transmission configuration indicator is identifying quasi co-location information.

In accordance with the example embodiments as described in the paragraphs above, wherein the quasi co-location information is configured with an indicator identifying at least one transmission configuration indicator group associated with the at least one transmission reception point for use by the user equipment to determine beams for the beam reporting.

In accordance with the example embodiments as described in the paragraphs above, wherein the at least one transmission configuration indicator is associated with a control resource pool index, wherein the control resource pool index uses a bit value to identifying beams of a transmission configuration indicator group associated with the at least one transmission reception point for use by the user equipment to determine beams for the beam reporting.

In accordance with the example embodiments as described in the paragraphs above, wherein the at least one beam reporting configuration comprises two or more beam reporting configurations, where the two or more beam reporting comprises individual configurations for each one or more transmission reception point of the at least one transmission reception point.

In accordance with the example embodiments as described in the paragraphs above, wherein the two or more beam reporting configurations are at least one of mutually associated or associated with another beam reporting configuration of the two or more beam reporting configurations.

In accordance with the example embodiments as described in the paragraphs above, wherein two channel state indication report configurations of the one or more channel state indication report configuration are associated with a radio resource control parameter of an associated report.

In accordance with the example embodiments as described in the paragraphs above, wherein any beam of the two or more associated beam reporting configurations is received by the user equipment simultaneously with any other beam of the two or more associated reporting configurations for an associated beam reporting.

A non-transitory computer-readable medium (Memory(ies) 125 as in FIG. 16 storing program code (Computer Program Code 123 and/or Report Module 140-2 as in FIG. 16), the program code executed by at least one processor (Processor(s) 120 and/or Report Module 140-1 as in FIG. 16) to perform the operations as at least described in the paragraphs above.

In accordance with an example embodiment of the invention as described above there is an apparatus comprising: means for is receiving (one or more buses 127; Computer Program Code 123 and/or Report Module 140-2; Processor(s) 120 and/or Report Module 140-1; and Processor(s) 120 and/or Report Module 140-1 as in FIG. 16), by a user equipment (UE 110 as in FIG. 16) of a communication network (Network 100 as in FIG. 16), from a network node (eNB/gNB 170 as in FIG. 16) information for measurement reporting by the user equipment for beam management in the communication network, wherein the information comprises an indication of at least one beam reporting configuration for more than one beam of at least one transmission reception point capable for simultaneous reception by the user equipment to be measured by the user equipment. Then as shown means based on the at least one beam reporting configuration, for determining (one or more buses 127; Computer Program Code 123 and/or Report Module 140-2; Processor(s) 120 and/or Report Module 140-1; and Processor(s) 120 and/or Report Module 140-1 as in FIG. 16) beam reporting at least one pair of beams of the more than one beam of the at least one transmission reception point capable for simultaneous reception by the user equipment.

In the example aspect of the invention according to the paragraph above, wherein at least the means for receiving and determining comprises non-transitory computer-readable medium (Memory(ies) 125 as in FIG. 16 storing program code (Computer Program Code 123 and/or Report Module 140-2 as in FIG. 16), the program code executed by at least one processor (Processor(s) 120 and/or Report Module 140-1 as in FIG. 16)

FIG. 22 illustrates operations which may be performed by a device such as, but not limited to, a network device (e.g., the eNB/gNB 170 as in FIG. 16). As shown in step 2210 of FIG. 22 there is determining, by a network node of a communication network, information for measurement reporting by user equipment for beam management in the communication network, wherein the information comprises an indication of at least one beam reporting configuration for more than one beam of at least one transmission reception point capable for simultaneous reception by the user equipment to be measured by the user equipment. Then as shown in step 2220 of FIG. 22 there is based on the determining, sending the information towards the user equipment for use in determining beam reporting of a pair of beams of the more than one beam of the at least one transmission reception point capable for the simultaneous reception by the user equipment.

In accordance with the example embodiments as described in the paragraph above, wherein the at least one beam reporting configuration comprises an indication of association of more than one beam with at least one of two or more transmission reception points or association of more than one beam with a same transmission reception point of the at least one transmission reception point.

In accordance with the example embodiments as described in the paragraphs above, wherein the information comprises each beam of the more than one beam is identified by a reference signal associated with one of a channel state information reference signal or a Synchronization Signal Block.

In accordance with the example embodiments as described in the paragraphs above, wherein based on the reference signal the user equipment is caused to select a best two beams of the more than one beam from different groups of at least one of a synchronization signal block group or a transmission configuration indication group or from two or more transmission reception points.

In accordance with the example embodiments as described in the paragraphs above, wherein an indication of the at least one of a synchronization signal block group or a transmission configuration indication group is sent to the user equipment via a radio resource control configuration associated with the information for measurement reporting.

In accordance with the example embodiments as described in the paragraphs above, wherein the at least one of a synchronization signal block group or a transmission configuration indication group identify which synchronization signal block group or transmission configuration indication group or which at least one transmission reception point the reference signal is associated with.

In accordance with the example embodiments as described in the paragraphs above, wherein the at least one transmission configuration indicator is identifying quasi co-location information.

In accordance with the example embodiments as described in the paragraphs above, wherein the quasi co-location information is configured with an indicator identifying at least one transmission configuration indicator group associated with the at least one transmission reception point for use by the user equipment to determine beams for the beam reporting.

In accordance with the example embodiments as described in the paragraphs above, wherein the at least one transmission configuration indicator is associated with a control resource pool index, wherein the control resource pool index uses a bit value to identifying beams of a transmission configuration indicator group associated with the at least one transmission reception point for use by the user equipment to determine beams for the beam reporting.

In accordance with the example embodiments as described in the paragraphs above, wherein the at least one beam reporting configuration comprises two or more beam reporting configurations, where the two or more beam reporting comprises individual configurations for each one or more transmission reception point of the at least one transmission reception point.

In accordance with the example embodiments as described in the paragraphs above, wherein the two or more beam reporting configurations are at least one of mutually associated or associated with another beam reporting configuration of the two or more beam reporting configurations.

In accordance with the example embodiments as described in the paragraphs above, wherein two channel state indication report configurations of the one or more channel state indication report configuration are associated with a radio resource control parameter of an associated report In accordance with the example embodiments as described in the paragraphs above, wherein any beam of the two or more associated beam reporting configurations is communicated to the user equipment simultaneously with any other beam for an associated beam reporting for an associated beam reporting.

A non-transitory computer-readable medium (Memory(ies) 155 as in FIG. 16 storing program code (Computer Program Code 153 and/or Report Module 150-2 as in FIG. 16), the program code executed by at least one processor (Processor(s) 152 and/or Report Module 150-1 as in FIG. 16) to perform the operations as at least described in the paragraphs above.

In accordance with an example embodiment of the invention as described above there is an apparatus comprising: means for determining (one or more buses 157; Memory(ies) 155; Computer Program Code 153 and/or Report Module 150-2; and Processor(s) 152 and/or Report Module 150-1 as in FIG. 16), by a network node (eNB/gNB 170 as in FIG. 16) of a communication network (network 100 as in FIG. 16), information for measurement reporting by user equipment (UE 110 as in FIG. 16) for beam management in the communication network, wherein the information comprises an indication of at least one beam reporting configuration for more than one beam of at least one transmission reception point capable for simultaneous reception by the user equipment to be measured by the user equipment. Then based on the determining, means for sending (one or more buses 157; Memory(ies) 155; Computer Program Code 153 and/or Report Module 150-2; and Processor(s) 152 and/or Report Module 150-1 as in FIG. 16) the information towards the user equipment for use in determining beam reporting of a pair of beams of the more than one beam of the at least one transmission reception point capable for the simultaneous reception by the user equipment.

In the example aspect of the invention according to the paragraph above, wherein at least the means for determining and sending comprises non-transitory computer-readable medium (Memory(ies) 155 as in FIG. 16 storing program code (Computer Program Code 153 and/or Report Module 150-2 as in FIG. 16), the program code executed by at least one processor (Processor(s) 152 and/or Report Module 150-1 as in FIG. 16).

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" can include at least one or more or all of the following:

(a) hardware-only circuit implementations (such as implementations in only analog and/or digital circuitry);
(b) combinations of hardware circuits and software, such as (as applicable):
(i) a combination of analog and/or digital hardware circuit(s) with software/firmware; and
(ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
(c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this ' circuitry' refers to at least the following:

(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. An apparatus comprising:
at least one processor; and
at least one memory, where the at least one memory is storing instructions that when executed by the at least one processor, cause the apparatus to at least:
receive from a network node information for measurement reporting by the apparatus for beam management in a communication network,
wherein the information comprises at least one beam reporting configuration for more than one beam of at least two transmission reception points to be measured by the apparatus,
based on the at least one beam reporting configuration, determine beam reporting at least one pair of beams of the more than one beam of the at least two transmission reception points,
wherein the apparatus receives the more than one beam simultaneously and separately from each of the at least two transmission reception points in at least one of a synchronization signal block group or a transmission configuration indication group identifying each beam of the more than one beam,
wherein each beam of the more than one beam is identified by a reference signal associated with one of a channel state information reference signal or a synchronization signal block; and
select, based at least on the reference signal, a best two beams of the more than one beam from different groups of the at least one of a synchronization signal block group or a transmission configuration indication group or from two or more transmission reception points.

2. The apparatus of claim 1, wherein the at least one beam reporting configuration comprises an indication of association of the more than one beam with the at least two or more transmission reception points.

3. The apparatus of claim 1, wherein the apparatus further caused to at least:
receive an indication of the at least one of a synchronization signal block group or a transmission configuration indication group via a radio resource control configuration associated with the information.

4. The apparatus of claim 1, wherein the at least one of a synchronization signal block group or a transmission configuration indication group identify which synchronization signal block group or transmission configuration indication group or which at least two transmission reception points the reference signal is associated with.

5. The apparatus of claim 1, wherein the at least one beam reporting configuration comprises two or more beam reporting configurations, wherein each respective beam reporting configuration comprises an individual configuration for each of the at least two transmission reception points.

6. A method, comprising:
receiving, by a user equipment of a communication network, from a network node information for measurement reporting by the user equipment for beam management in the communication network,
wherein the information comprises least one beam reporting configuration for more than one beam of at least two transmission reception points to be measured by the user equipment;
and based on the at least one beam reporting configuration, determining beam reporting at least one pair of beams of the more than one beam of the at least two transmission reception points,
wherein the user equipment receives the more than one beam simultaneously and separately from each of the at least two transmission reception points in at least one of a synchronization signal block group or a transmission configuration indication group identifying each beam of the more than one beam, and
wherein each beam of the more than one beam is identified by a reference signal associated with one of a channel state information reference signal or a synchronization signal block; and
selecting, by the user equipment based on the reference signal, a best two beams of the more than one beam from different groups of at least one of a synchronization signal block group or a transmission configuration indication group or from two or more transmission reception points.

7. The method of claim 6, wherein the at least one beam reporting configuration comprises an indication of association of the more than one beam with the at least two or more transmission reception points.

8. The method of claim 6, further comprising:
receiving, by the user equipment, an indication of the at least one of a synchronization signal block group or a transmission configuration indication group via a radio resource control configuration associated with the information.

9. The method of claim 6, wherein the at least one beam reporting configuration comprises two or more beam reporting configurations, wherein each respective beam reporting configuration comprises an individual configuration for each of the at least two transmission reception points.

10. An apparatus comprising:
at least one processor; and at least one memory where the at least one memory is storing instructions that when executed by the at least one processor, cause the apparatus to at least:
determine information for measurement reporting by a user equipment for beam management in a communication network,
wherein the information comprises at least one beam reporting configuration for more than one beam of at least two transmission reception points to be measured by the user equipment
based on the determining, send the information towards the user equipment for use in determining beam reporting of a pair of beams of the more than one beam of the at least two transmission reception points
wherein the user equipment receives the more than one beam simultaneously and separately from each of the at least two transmission reception points in at least one of a synchronization signal block group or a transmission configuration indication group identifying each beam of the more than one beam, and,
wherein each beam of the more than one beam is identified by a reference signal associated with one of a channel state information reference signal or a synchronization signal block, and
wherein, based at least on the reference signal, there is selected a best two beams of the more than one beam from different groups of at least one of a synchronization signal block group or a transmission configuration indication group or from two or more transmission reception points.

11. The apparatus of claim 10, wherein the at least one beam reporting configuration comprises an indication of association of the more than one beam with the at least two or more transmission reception points.

12. The apparatus of claim 11, wherein the apparatus is further caused to:
send an indication of the at least one of a synchronization signal block group or a transmission configuration indication group to the user equipment via a radio resource control configuration associated with the information for measurement reporting.

13. The apparatus of claim 11, wherein the at least one of a synchronization signal block group or a transmission configuration indication group identify which synchronization signal block group or transmission configuration indication group or which at least two transmission reception points the reference signal is associated with.

14. The apparatus of claim 10, wherein the at least one beam reporting configuration comprises two or more beam reporting configurations, wherein each respective beam reporting configuration comprises an individual configuration for each of the at least two transmission reception points.

* * * * *